(12) United States Patent
Bugdayci et al.

(10) Patent No.: US 11,640,348 B2
(45) Date of Patent: May 2, 2023

(54) GENERATING ANOMALY ALERTS FOR TIME SERIES DATA

(71) Applicant: salesforce.com, inc., San Francisco, CA (US)

(72) Inventors: Ahmet Bugdayci, Los Altos, CA (US); Mario Sergio Rodriguez, Santa Clara, CA (US); Linda Wei, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/155,810

(22) Filed: Jan. 22, 2021

(65) Prior Publication Data
US 2022/0237102 A1 Jul. 28, 2022

(51) Int. Cl.
| | | |
|---|---|---|
| G06F 11/34 | (2006.01) | |
| G06F 11/30 | (2006.01) | |
| G06F 11/32 | (2006.01) | |
| G06N 20/00 | (2019.01) | |
| H04L 9/40 | (2022.01) | |

(52) U.S. Cl.
CPC ...... *G06F 11/3495* (2013.01); *G06F 11/3051* (2013.01); *G06F 11/327* (2013.01); *G06N 20/00* (2019.01); *H04L 63/1425* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |

(Continued)

OTHER PUBLICATIONS

Office Action dated Mar. 3, 2022 for U.S. Appl. No. 17/155,670 (pp. 1-7).

(Continued)

*Primary Examiner* — Anh Nguyen
(74) *Attorney, Agent, or Firm* — Kwan & Olynick LLP

(57) ABSTRACT

Systems and methods are described for applying a plurality of data points of a time series data set representing values of a metric measuring performance of a cloud computing service to a machine learning model to predict a forecast of a most likely value of the metric at a selected future time. The method includes determining whether the plurality of data points of the time series data set are anomalies according to the machine learning model and the forecast and generating a collective anomaly from the anomalies when the plurality of data points is determined to be anomalies. The method further includes determining whether the collective anomaly does not meet one or more cloud computing service level objective (SLO) threshold requirements and sending an alert when the collective anomaly does not meet one or more cloud computing SLO threshold requirements.

22 Claims, 14 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 9,697,316 B1 | 7/2017 | Taylor |
| 11,089,108 B2 * | 8/2021 | Shah .................. G06Q 10/04 |
| 11,226,964 B1 | 1/2022 | Cairney |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0288414 A1 * | 12/2007 | Barajas .................. G06N 20/00 706/46 |
| 2009/0177744 A1 | 7/2009 | Marlow et al. |
| 2010/0017262 A1 | 1/2010 | Iyer |
| 2011/0066615 A1 | 3/2011 | Pradhan |
| 2015/0294256 A1 | 10/2015 | Mahesh |
| 2018/0300296 A1 | 10/2018 | Ziraknejad |
| 2020/0394199 A1 | 12/2020 | Haldar |
| 2021/0098099 A1 | 4/2021 | Neumann |
| 2021/0365643 A1 * | 11/2021 | Agrawal .................. G06F 7/24 |

OTHER PUBLICATIONS

Notice of Allowance dated May 12, 2022 for U.S. Appl. No. 17/155,670 (pp. 1-5).

Guttenberg, Nicholas, et al. "Permutation-equivariant neural networks applied to dynamics prediction." (Year: 2016).

Liang Pang et al. 2020. SetRank: Learning a Permutation-Invariant Ranking Model for Information Retrieval. In Proceedings of the 43rd International ACM SIGIR Conference on Research and Development in Information Retrieval (SIGIR '20). Association for Computing Machinery, New York, NY, USA, 499-508. (Year: 2020).

Office Action (Non-Final Rejection) dated Aug. 24, 2022 for U.S. Appl. No. 17/162,859 (pp. 1-14).

Office Action (Non-Final Rejection) dated Aug. 26, 2022 for U.S. Appl. No. 17/155,676 (pp. 1-19).

* cited by examiner

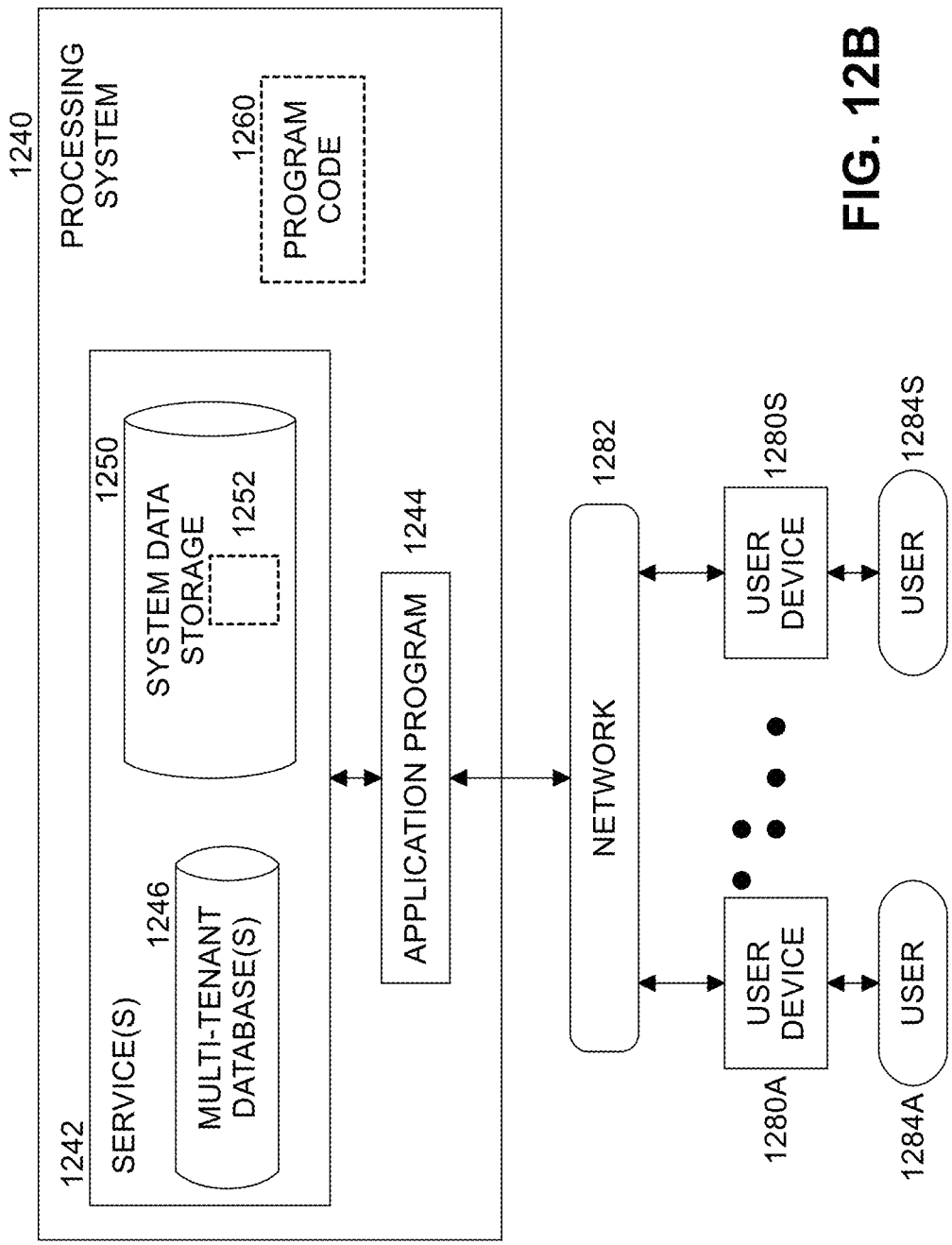

GENERATING ANOMALY ALERTS FOR TIME SERIES DATA

TECHNICAL FIELD

One or more implementations relate to cloud computing environments, and more specifically to generating alerts for anomalies from time series data representing events derived from user interface logs of applications in a distributed system of a cloud computing environment.

BACKGROUND

"Cloud computing" services provide shared resources, software, and information to computers and other devices upon request or on demand. Cloud computing typically involves the over-the-Internet provision of dynamically scalable and often virtualized resources. Technological details can be abstracted from end-users, who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to end-users can include the ability for a user to create, view, modify, store and share documents and other files.

In some situations, it may be desirable to measure the performance of these cloud computing services. Measuring performance typically involves processing of a large complex data set. In some cases, the data set is represented as time series data. Various methods for detecting anomalies in time series data are known. However, these methods are typically tuned specifically for individual data sets that conic from a known distribution. This is problematic for cloud computing environments supporting many organizations through multi-tenancy.

BRIEF DESCRIPTION OF THE DRAWINGS

The included drawings are for illustrative purposes and serve to provide examples of possible structures and operations for the disclosed inventive systems, apparatus, methods, and computer-readable storage media. These drawings in no way limit any changes in form and detail that may be made by one skilled in the art without departing from the spirit and scope of the disclosed implementations.

FIG. 12B is a block diagram of a deployment environment according to some example implementations.

DETAILED DESCRIPTION

Figure 1:
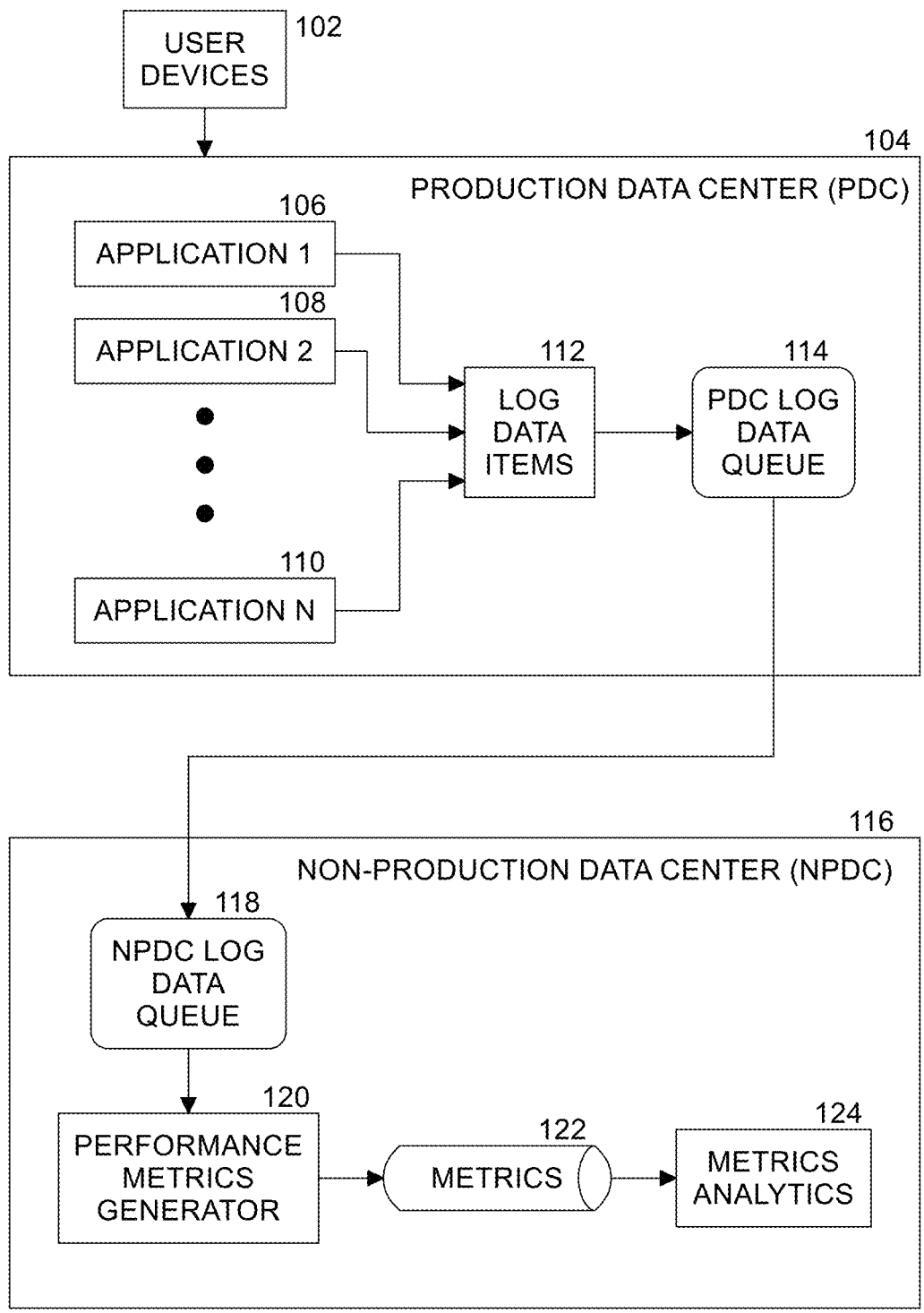
FIG. 1 illustrates an example computing environment according to some embodiments.

Embodiments of the present disclosure provide a data processing pipeline using a modular representation of raw log data and generating one or more performance metrics based at least in part on the raw log data in an efficient and reproducible way. In one embodiment, the source of the raw log data is obtained from observing user interactions or user performance from a user interface of an application in a cloud computing environment. Some types of performance metrics are search relevance metrics (e.g., click through rate (CTR) for search results, etc.), however, embodiments may be generalized to other application domains.

In one example cloud computing environment, performance metrics are generated to measure the utilization of a search feature in an application program by analyzing the log data of the application program. Such analysis requires multiple different aggregation metrics on the log data, and the log data is typically very large, due to the fact of the scale of the use of the application program by many users in the cloud computing environment (e.g., the system supports multitenancy, includes thousands of organizations, millions of users (perhaps even tens of millions of users)).

In one example cloud computing environment, there are over two hundred thousand client organizations, each having their own usage behavior, complex objects, and preferred query types that significantly impact system performance. Each organization includes thousands, perhaps millions, of users. Additionally, there are other variables in the system such pods, platforms, and features (such as personalization) that can also significantly impact system performance. When system performance for any organization and/or user is affected by a potential error known as an anomaly, an alert may be generated to notify a team of system administrators of the cloud computing environment of the potential error. However, so many alerts may be generated that they flood the system and overwhelm the team's ability to analyze and respond to them. Further, some of the alerts are "false positives" which when analyzed by the team prove to not be errors at all.

A simple approach is to treat each organization separately and build anomaly models for each organization. Alerts may be automatically filtered by an anomaly model. However, given the size of tenant organizations (e.g., thousands or millions of users), the resulting anomaly alerts still cannot be investigated by the team receiving these alerts. The aggregation of tenant data for a single source of alerts (such as one organization) on the other hand loses precision for purposes of error analysis since organization level degradations may be hard to detect when taking a global view of the alerts.

Another problem of large-scale multitenancy is that noise (e.g., false positives) may be inflated exponentially. For example, if an organization has a 0.1% probability of having noisy daily interaction data, one false positive error classification would typically be reported over a three-year period in a known anomaly analysis model. However, in a cloud computing environment having, for example, over two hundred thousand organizations, each organization having its own individual anomaly analysis model, this would translate into expected number of 600 anomaly alerts per day for the entire cloud computing environment. Considering that the team of system administrators cannot immediately tell if an anomaly was caused by an actual error or was due to noise, the team will have to investigate and analyze each anomaly, which is infeasible for large scale cloud computing services.

Embodiments of the present disclosure include a system and method for reducing the number of noisy alerts while still detecting potentially serious catastrophic alerts. Embodiments identify multiple dimensions for strengthening the confidence in the process of filtering alerts and identifying optimal service level indicators (SLIs) which can be bounded by service level objectives (SLOs), and only trigger an alert if these thresholds are exceeded.

FIG. 1 illustrates an example computing environment 100 according to some embodiments. At least one production data center (PDC) 104 in a cloud computing environment comprises a plurality of conventional computer servers, storage devices, and network interfaces (not shown) to run computer applications for users. Users interact with user devices 102 to access the applications running in the PDC over one or more computer or communications networks. Examples of user devices include laptop and desktop personal computers, smart phones, tablet computers, personal digital assistants (PDAs), smart home appliances, home networking equipment, and so on. PDC 104 runs a plurality of applications 1 106, 2 108, . . . N 110, where N is a natural number. In some situations, N may be very large—millions or even tens of millions of instances of applications being accessed by millions or tens of millions of users worldwide. In some scenarios, PDC 104 is operated by a cloud service provider (CSP) and comprises a plurality of production data centers distributed in sites throughout the world. In one embodiment, at least one application is a search service. In some embodiments, there are multiple PDCs.

In order to measure the performance of applications 106, 108, . . . 110, data is collected from the applications. In one embodiment, applications 106, 108, . . . 110 are instrumented by application developers to provide log data items 112. Log data items 112 comprise any information relating to the applications that can be measured to assess system performance of PDC 104 and/or the applications. For example, when an application, such as application 2 108 for example, is a search application, log data items 112 may include user typing actions (the user entering text using a physical or virtual keyboard, for example), mouse selections (e.g., clicks), mouse hovers, search terms, hyperlink selections (clicks), etc. Each log data item 112 may include a plurality of fields such as log type, attributes, time stamp, etc. In some embodiments, the format of each log data item is a "free form" text as determined by the developer of the application generating the log data item. In some embodiments, there is no universal format of the log data items, and thus they may be in any format. There may be any number of log data items 112 generated by applications over a selected period of time. In some scenarios, the number of log data items generated may be extremely large, perhaps in the millions, tens of millions, hundreds of millions, or even billions of log data items in a plurality of PDCs over a selected period of time (which may be a minute, an hour, a day, a week, a month, a quarter, a year, etc.).

As log data items 112 are generated by the applications, the log data items are inserted into at least one PDC log data queue 114. In one embodiment, the at least one PDC log data queue 114 is implemented as a Kafka® message queue available from the Apache® Software Foundation on the Internet at kafka.apache.org, although other message queues may also be used. Apache® Kafka® is an open-source stream-processing software platform developed by the Apache® Software Foundation, written in Scala and Java. The project aims to provide a unified, high-throughput, low-latency platform for handling real-time data feeds.

At least one non-production data center (NPDC) 116 communicates with PDC 104 to read log data items 112 from the at least one PDC log data queue 114. Log data items 112 obtained from the at least one PDC log data queue 114 of PDC 104 are stored in NPDC log data queue 118 in NPDC 116. In one embodiment, NPDC log data queue 118 is also a Kafka® message queue, although other message queues may also be used. In an embodiment, NPDC 116 is situated at a different location than the at least one PDC 104. In another embodiment, NPDC 116 is situated at the same location as at least one of the PDCs 104. In an embodiment, NPDC 116 does not run applications for access by user devices 102, but instead runs applications and/or tools for research and development activities, data center monitoring activities, and so on.

Performance metrics generator 120 reads log data items from NPDC log data queue 118 and generates metrics 122 representing measurements of the performance of applications by PDC 104. Metrics 122 may be input to metrics analytics 124. Metrics analytics 124 uses metrics 122 to present information to systems administrators of NPDC 116 and/or PDC 104 to allow the systems administrators to manage PDC 104 to provide better service to user devices 102. In an embodiment, metrics analytics 124 includes a visual dashboard capability representing current operating attributes of PDC 104. In an embodiment, metrics analytics 124 includes machine learning (ML) processes to analyze metrics 122 to improve cloud computing services to user devices 102. In an embodiment, metrics analytics 124 automatically communicates with PDC 104 to instruct the PDC to change one or more operating characteristics of the PDC based on metrics 122. In some embodiments, metrics analytics 124 is replaced by any program for analyzing and/or interpreting metrics 122.

In one embodiment, each UI interaction event or performance event is represented as a JavaScript object notation (JSON) object containing a collection of key-value pairs. There is no schema defined for the JSON objects, so the applications 106, 108, . . . 110 executing in PDC 104 of the cloud computing environment that are generating the log data items have the flexibility to log any attributes in "free form" text (e.g., a list of text strings separated by commas) without being restricted to a fixed set of attributes.

This flexibility of using key-value pairs to describe event attributes in log data items is convenient for the producers of those logs (e.g., those applications being assessed such as application 1 106, application 2 108, . . . application N 110). However, this flexibility creates problems for downstream applications that need to consume those event attributes, such as performance analysis applications (e.g., metrics analytics 124).

In some embodiments, performance metrics generator 120 system generates metrics 122 based on UI interactions and performance events logged by applications. Changes, intentional or not, in the instrumentation such as attribute structure changes or unexpected attribute values can have a negative impact on the quality of the metrics 122 used to monitor and update the cloud computing environment. Many times those changes go unnoticed until a later time, because those changes don't often lead to "hard" failures (like exceptions or causing a visible failure to an application program (such as application 1 106, application 2 108, . . . application N 110) being used by the user, which would prompt the user to generate a case or file a bug), but instead lead to "soft" failures, such as the gradual degradation of metrics, often masked, at least initially, by the normal variability in metrics tracked in PDC(s) 104 of the cloud computing environment.

For example, assume a system administrator of the cloud computing environment wants to assess how relevant are the search results generated by a search service by using a click-through rate (CTR) metric on a search results page. In one example, the formula for a Search Results Page CTR is calculated as equal to: (# of user clicks on the Search Results page)/(# of Search Results Pages shown to the user).

An example click event logged for each user click on the Search Results page is shown in Table 1. In one embodiment, for a click event to be counted in the Search Results page CTR for performance measurement purposes, the metrics calculation requires that "attributes.sessionId" is non-null.

TABLE 1

```
"payload": {
    "eventSource": "click",
    "eventType": "user",
    "locator": "searchResultPage",
    "attributes: {
        "sessionId": "123456",
        "clickSource":"SearchResult",
        "recordId": "ka0Rqwert",
        "queryId": "1tmowa4qw8i5y"
    }
}
```

Now let's assume there has been a change made to the event logging code in one of the applications 106, 108, . . . 110; for example, a new map "searchActivity" containing "sessionId" was introduced in the click event as shown in Table 2. Assume that the change has not been communicated to system administrators operating performance metrics generator 120 in NPDC 116.

TABLE 2

```
"payload": {
    "eventSource": "click",
    "eventType": "user",
    "locator": "searchResultPage",
    "attributes: {
        "searchActivity": {
        "sessionId": "123456",
        }
        "clickSource":"SearchResult",
        "recordId": "ka0Rqwert",
        "queryId": "1tmowa4qw8i5y"
    }
}
```

Since performance metrics generator 120 is not aware of the changes, all such click events would be left out of the metrics 122 calculation after the changes were deployed to production in PDC 104. This results in erroneous and misleading metrics 122.

Changes in event formats may cause other problems. Even once an event format change is identified, trouble-shooting the root cause of metrics issues becomes more difficult, since there can be various scenarios where clicks could be missing, for example, a bug in the UI could be preventing clicks from being registered, preventing clicks from being logged, the events could be queued up in PDC log data queue 114, etc. In addition, in cases where multiple kinds of clicks are being tracked, in different UI experiences, it is possible that the application developer may not have changed the event format for the logged click in all possible instances in the application, so instead of logging no clicks, perhaps only a portion of clicks are unlogged. Even in cases when a change in metrics 122 results from a change in event format, determining which specific field changed in log data feeding into a metric 122 can be difficult and time-consuming (e.g., the change could result in a drop in the numerator of a metric, or the denominator of a metric, or both).

Embodiments of the invention detect unexpected errors in semi-structured log data items 112 and analyze the impact of those errors by tying the errors directly to the quality of metrics 122 using a rule-based system. One goal is to have an objective way to evaluate the quality of generated metrics on a periodic basis by examining the information gaps in logged events between the producer (e.g., the developer of applications 106, 108, . . . 110) and consumer (e.g., metrics analytics 124 in NPDC 116) of semi-structured log data items.

Figure 2:
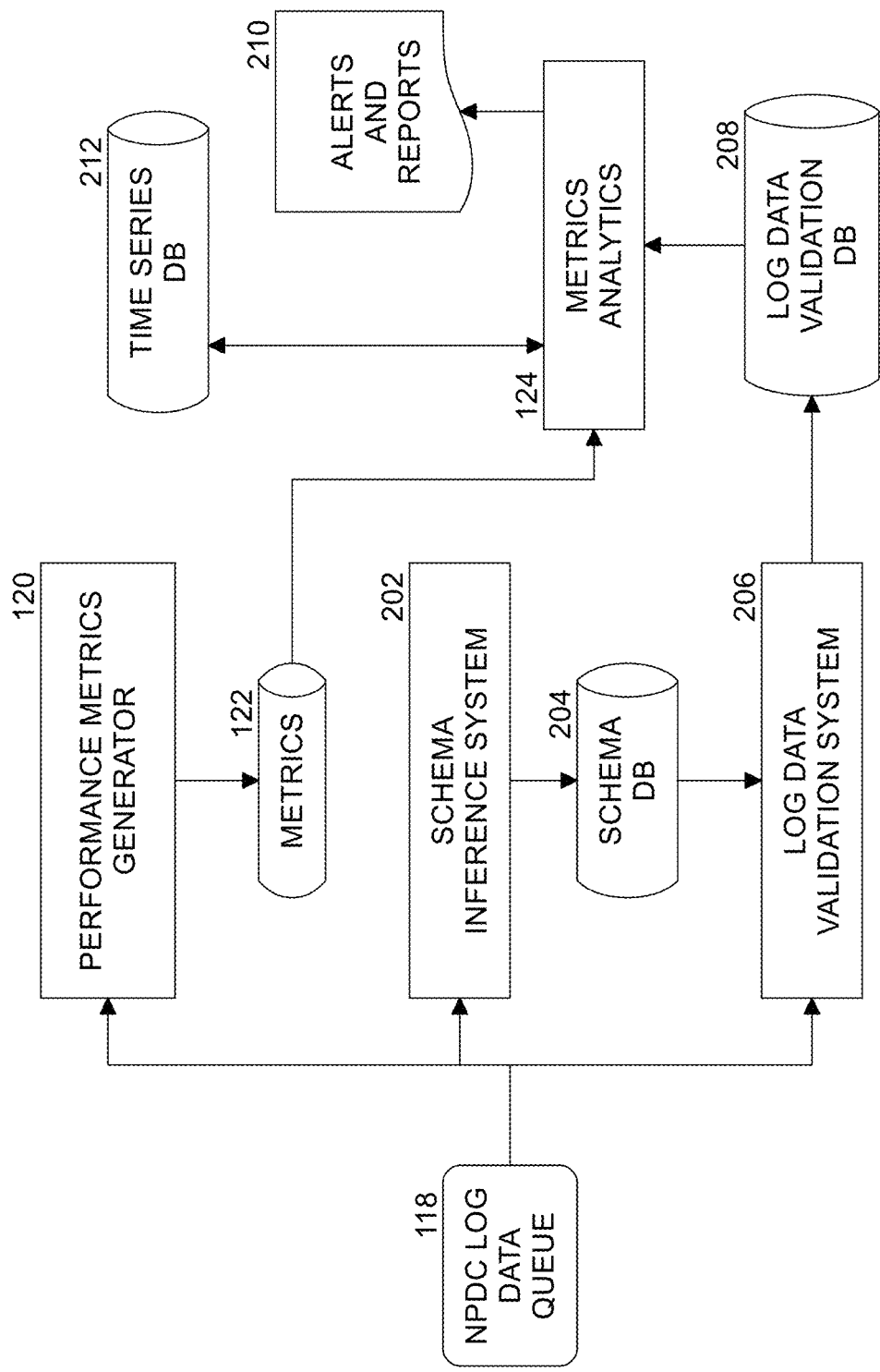
FIG. 2 is a diagram of an example performance metrics system according to some embodiments.

FIG. 2 is a diagram of an example schema inference and log data validation system 200 according to some embodiments. Performance metrics generator 120 generates metrics 122 based at least in part on log data items 112 retrieved from NPDC log data queue 118. Performance metrics generator 120 reads log data items 112 from NPDC log data queue 118, analyzes the log data items by an events generator (not shown in FIG. 2) within performance metrics generator 120 using event definitions to generate events stored in an events table and dimensions stored in a dimensions table, and analyzes the events and dimensions using metrics definitions by a metrics generator (not shown in FIG. 2) within performance metrics generator 120 to generate metrics 122. In one embodiment, performance metrics generator 120 parses log data items to find events in the log data items, wherein an event comprises at least a portion of a selected log data item matching an event definition; aggregates a plurality of performance metric definitions into a single expression; and generates a plurality of performance metrics 122 from the events, in one pass through the events, by applying the single expression to the events.

Schema inference system 202 reads log data items 112 from NPDC log data queue 118 and automatically infers one or more schemas based at least in part on analysis of the semi-structured log data items. As used herein, a schema defines the field names and data types for a dataset (e.g., log data items 112). Inferred schemas are stored in schema database (DB) 204. Log data validation system 206 reads log data items 112 from NPDC log data queue 118 and compares the log data items to inferred schemas from schema DB 204 to identify any log data item errors. Log data item errors are stored in log data validation DB 208. Metrics analytics 124 analyzes log data item errors from log data validation DB 208 with respect to metrics 122 generated by performance metrics generator 120 to determine an effect, if any, of the log data item errors on a quality measurement of metrics 122. Metrics analytics 124 generates a plurality of alerts and reports 210 as needed. Metrics analytics 124 also stores metrics 122 and/or selected log data validation DB information into time series DB 212 for possible further trend analysis. If the quality measurement does not meet a predetermined threshold, an alert (as part of alerts and reports 210) may be sent to a system administrator of NPDC 116 and/or PDC 104.

Figure 3:
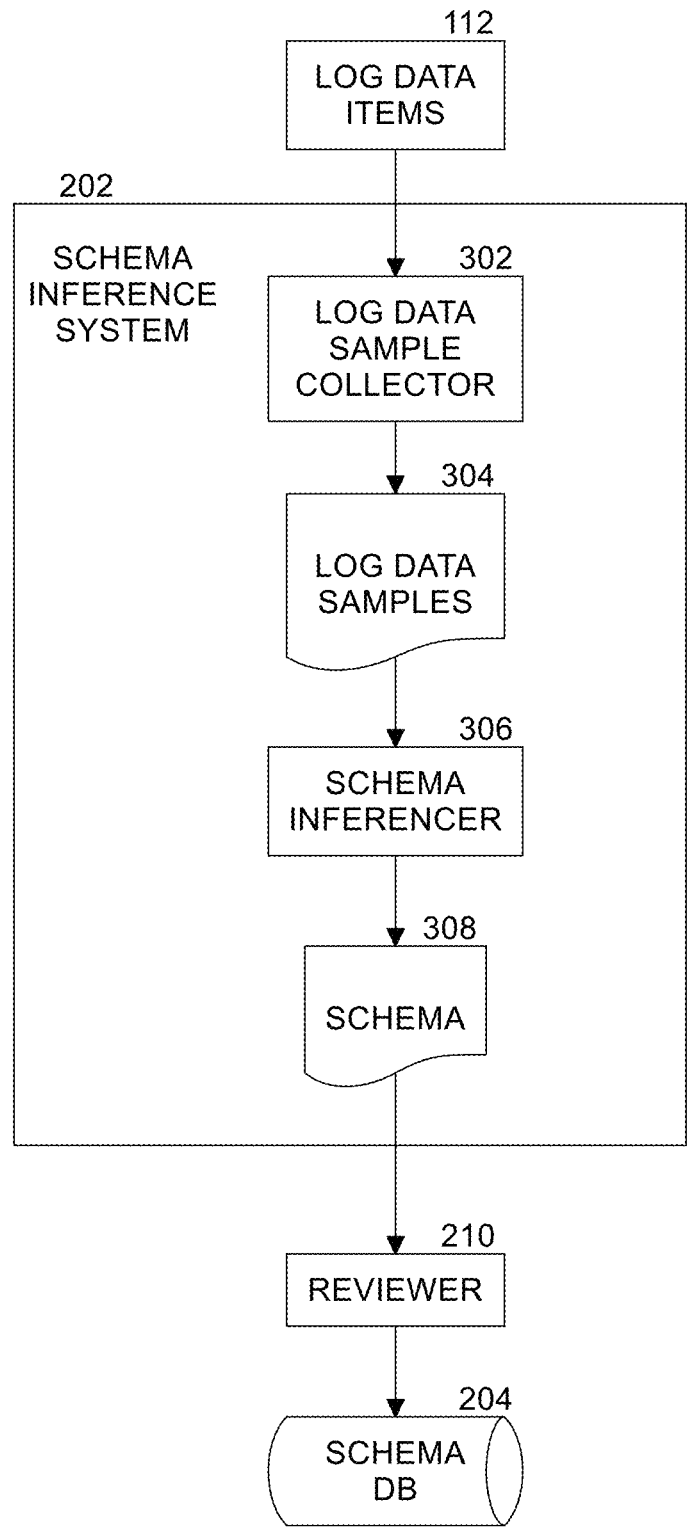
FIG. 3 is a diagram of a schema inference system according to some embodiments.

FIG. 3 is a diagram of schema inference system 202 according to some embodiments. In embodiments, one or more schemas 308 are automatically inferred for all log data items 112 that contribute to metrics generation. In an embodiment, schema inferencing may be performed every time a new release of one or more applications 106, 108, . . . 110 is deployed into production in PDC 104 for access by user devices 102, because changes in applications may result in changes to the format of log data items produced by those applications. Examples of log data items 112 include click events on a Search Results page and impression events of a Search Results page. Applications 106, 108, . . . 110 may output log data items 112 in several different formats, such as JavaScript object notation (JSON), Extensible Markup Language (XML), yet another markup language (YAML), key-value pairs, or comma separated values (CSV). In one embodiment, log data items 112 are in a semi-structured JSON format and schema inferencer 306 is implemented using an existing library called Apache® Kite software development kit (SDK) (available on the Internet at kitesdk.org) to generate one or more schemas 308 from the semi-structured JSON objects. Kite parses the log data items in the semi-structured format, determines data types of attributes, determines the structure of the data types, and produces one or more schemas 308 reflecting a format of the data types. In other embodiments, other methods of schema inferencing may be used.

Schemas 308 automatically inferred by schema inferencer 306 need to be vetted and approved by a reviewer 210 before storing the schemas in schema DB 204. Reviewer 210 is a person, such as a system administrator of PDC 104 or NPDC 116. Reviewer 210 may in some cases edit the schemas 308 to correct the schemas to more accurately reflect desired formats of the log data items. In some scenarios, there may be many schemas 308 (e.g., hundreds, thousands, or even tens of thousands of schemas in large cloud computing environments having many applications running in many PDCs 104).

In some embodiments, schema inference system 202 includes log data sample collector 302. For a given release of an application, log data sample collector 302 obtains samples 304 of log data items 112 from production logs generated by the applications running in PDC 104. Only samples 304 of log data items 112 are needed to infer schemas, rather than entire logs (which may be too large to efficiently infer schemas). In one embodiment, Spunk® Enterprise software for searching, monitoring and analyzing big data streams, commercially available from Splunk®, Inc., is used to obtain log data samples 304 from log data items 112. In other embodiments, log data samples may be collected from other sources, such as Apache® Kafka® (an open-source stream processing platform available on the Internet at kafka.apache.org), files downloaded by file transfer protocol (ftp), a Hadoop® File System (HDFS) connector if the data source is on a HDFS, etc.

As noted above, log data samples are semi-structured and may be changed for a given release of an application.

An example of a log data sample 304 is shown below:
{"reventSource": "click", "eventType": "user", "locator": "searchResultPage", "attribute"}
{"eventSource": "click", "eventType": "user", "locator": "searchResultPage", "attribute"}
{"eventSource": "click", "eventType": "user", "locator": "searchResultPage", "attribute"}

In one embodiment, schema 308 is an Avro™ schema file. Avro™ is a row-oriented remote procedure call and data serialization framework developed by the Apache® Software Foundation within Apache's Hadoop® project (available on the Internet at avro.apache.org). Avro™ uses JSON for defining data types and protocols and serializes data in a compact binary data encoding format. In another embodiment, schema 308 is in an XML scheme definition (XSD) format.

An example of a schema 308 is shown below.

```
{
    type": "record",
    "name": "payload",
    "fields": [ {
        "name": "eventSource",
        "type": "string",
        "doc": "Type inferred from '\"click\"'"
    }, {
        "name": "eventType",
        "type": "string",
        "doc": "Type inferred from '\"user\"'"
    }, {
        "name": "locator",
        type": "string",
        "doc": "Type inferred from '\"searchResultPage\"'"
    }, {
        "name": "attributes",
        "type": {
            "type": "record",
            "name": "attributes",
            "fields": [ {
                "name": "clickSource",
                "type": "string",
                "doc": "Type inferred from '\"SearchResult\"'"
            }, {
                "name": "sessionId",
                "type": "string",
                "doc": "Type inferred from '\"bda6d746-5192-e893\"'"
            }, {
                "name": "queryId",
                "type": "string",
                "doc": "Type inferred from '\"5y5t1zrz\"'"
            }, {
                "name": "recordId",
                "type": "string",
                "doc": "Type inferred from '\"5000M0000\"'"
            }]
        }
    }]
}
```

Figure 4:
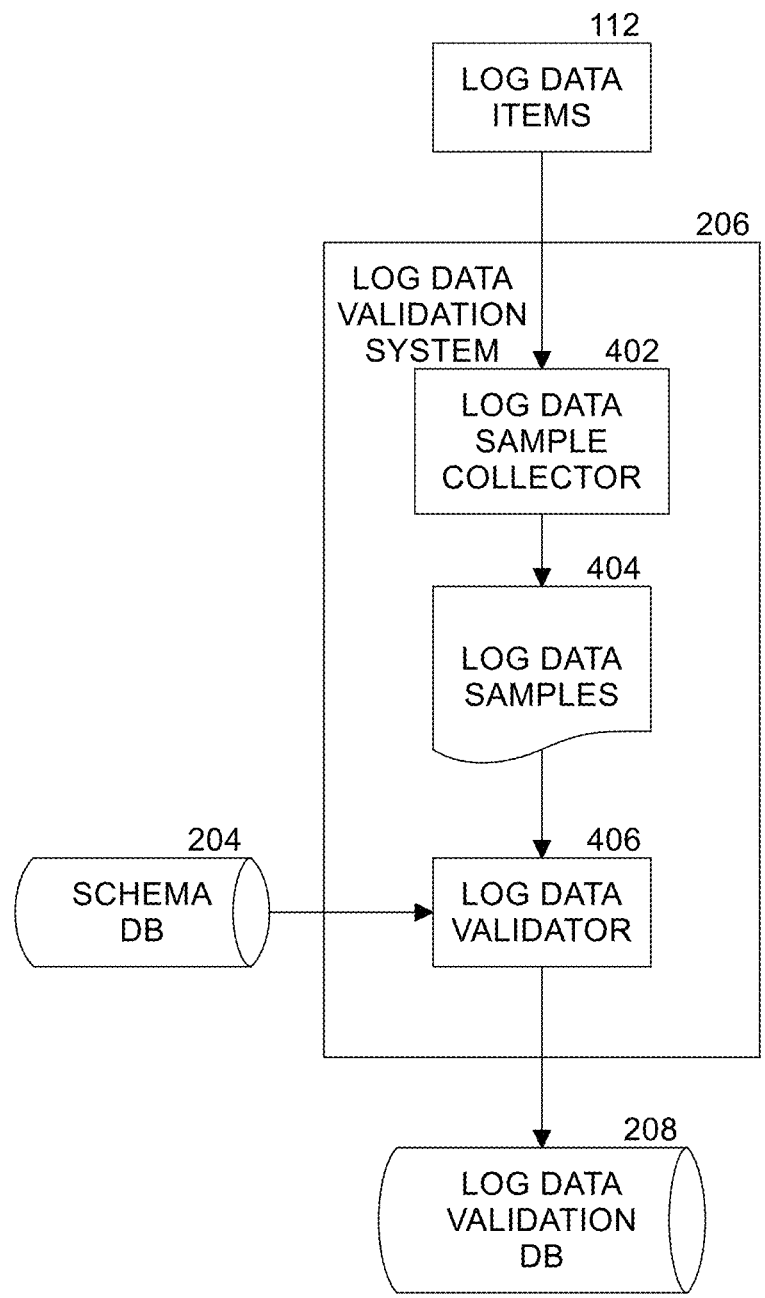
FIG. 4 is a diagram of a log data validation system according to some embodiments.

FIG. 4 is a diagram of log data validation system 206 according to some embodiments. In one embodiment, log data validation system 206 is run on a periodic basis (for example, daily, every other day, weekly, monthly, and so on) or on demand by a system administrator. Log data samples 404 are collected by log data sample collector 402 from log data items 112 in NPDC log data queue 118. Only samples 404 of log data items are needed to detect log data item errors, rather than entire logs (which may be too large to efficiently process). Log data samples 404 are validated against corresponding schemas 308 from schema DB 204 by log data validator 406. A validation summary of any detected errors is created for each run and stored in log data validation DB 208.

In one embodiment, Spunk® Enterprise software for searching, monitoring and analyzing big data streams, commercially available from Splunk®, Inc., is used to obtain log data samples 404 from log data items 112. In other embodiments, log data samples may be collected from other sources, such as Apache® Kafka® (an open-source stream processing platform available on the Internet at kafka.apache.org), files downloaded by file transfer protocol (ftp), a Hadoop® File System (HDFS) connector if the data source is on a HDFS, etc.

As noted above, log data samples 404 are semi-structured and may be changed for a given release of an application.

An example of a log data sample 404 is shown below:
{"eventSource": "click", "eventType": "user", "locator": "searchResultPage", "attribute"}
{"eventSource": "click", "eventType": "user", "locator": "searchResultPage", "attribute"}
{"eventSource": "click", "eventType": "user", "locator": "searchResultPage", "attribute"}

Log data validator 406 validates a collection of log data samples 404 against a corresponding schema 308 from schema DB 204. What should be validated depends on the specifics of the format in which the log data items are outputted, and inferred schema 308. It also depends on a specific use case. For example, the significance of the field order might play an important role in how a log data item is interpreted. In one embodiment, the types of errors log data validator 406 reports include: missing required fields, fields with unexpected data types, and fields with unexpected values. In one embodiment, log data validator 406 is implemented using open-source software Avro™ Schema Validator available on the Internet at www*npmjs*com*package*avro-schema-validator (with "." and "/" being replaced by "*" to deactivate live links). In other embodiments, other schema validators may be used. The output of log data validator 406 includes time series metrics, a validation summary and all log data item errors found during the validation process, all of which are stored in log data validation DB 208. The time series metrics may include a count of each type of error. In one embodiment, the validation summary includes a total number of log data items processed, a total number of valid log data items, a violation map comprising a summary of each type of log data item error found from the schema comparison and the number of log data items that have the specific error. In one embodiment, the violation map is a mapping from (field, type of error, schema version, log type) to the number of errors found.

An example of a violation map stored in log data validation DB 208 is below.
[errorType=missing_value, field=attributes.sessionId, schema=rel_10_search_results_click.avsc, logType=searchui]→105
[errorType=missing_value, field=attributessecordId, schema=rel_10_search_results_click.avsc, logType=searchui]→28
[errorType=wrong_datatype, field=attributessecordId, schema=rel_10_search_results_click.avsc, logType=searchui]→5

An example of a list of log data item errors stored in log data validation DB 208 is below.
{"errorCategory":{"errorType":"missing_value","field": "attributes.sessionId","schema":
{"errorCategory":{"errorType":"wrong_datatype","field": "attributes.recordId","schema":
. . . .

Figure 5:
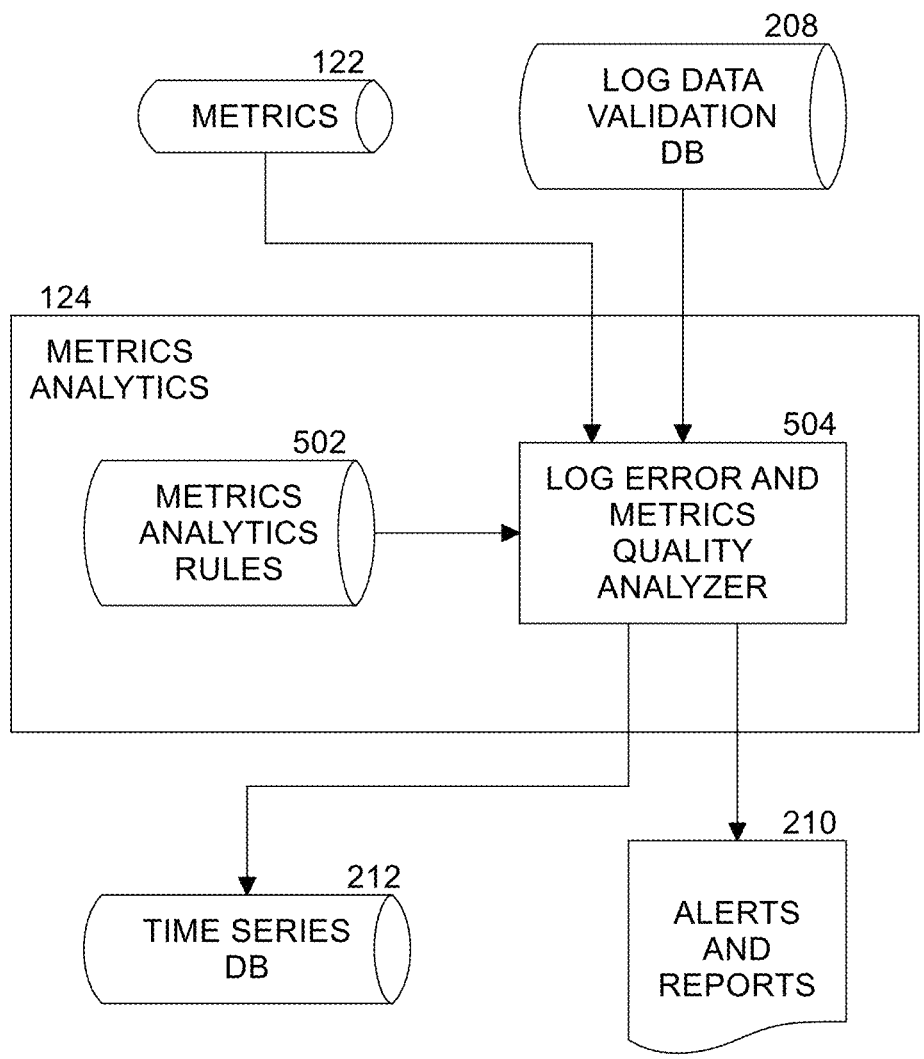
FIG. 5 is a diagram of a metrics analytics tool according to some embodiments.

FIG. 5 is a diagram of metrics analytics 124 according to some embodiments. Given a set of metrics analytics rules 502, log error and metrics quality analyzer 504 of metrics analytics 124 examines each type of log data item error in log data validation DB 208 reported by log data validator 406 and analyzes the impact of the log data item errors on metrics 122 produced by performance metrics generator 120. The analysis may trigger alerts in alerts and reports 210 to be emailed to a system administrator if the errors cause an impact to a quality measurement of one or more metrics 122 such that the quality measurement fails to meet a predetermined threshold. One type of log data item error may have an impact on multiple metrics, with varying degrees of impact.

Time series metrics generated by log data validator 406 are uploaded to time series DB 212 for trend analysis. In one embodiment, an open-source time series monitoring and alerting platform called Argus (available on the Internet at openargus.org) is used as time series DB 212.

An example of a metrics analytics rule is when a number of log data item errors in log data items used by a metric 122 is more than 5% of the log data items used, then send an alert.

In an example, assume an event is being processed, such as a search_initiation_event as follows:

```
{
  "event": "search_initiation_event",
  "platform": "LEX",
  "selectors": {
    "appName": "one:one",
    "payload_eventSource": "synthetic-click",
    "payload_locator_scope": "search-input-desktop",
    "payload_locator_target": "search-input"
  },
  "not_null_fields": ["payload_attributes_searchDialogSessionId"],
  "null_fields": [ ]
}
```

For this event, the number of times the payload_attributes_searchDialogSessionId is null may be tracked. For example, if a current error rate is approximately 4%, the following metrics are examples of metrics that may use the search_initiation_event: val and oer. The metric may be:

```
Metric
= {
  new Metric(
  "OER",
  Seq("LEX", "ES"),
  castAndSum(col("ta_clk") || col("ta_preview_clk") || col("mru_clk") ||
  col("mru_preview_clk") || col("lv_clk") || col("lv_preview_clk") || col("cq_clk") ||
  col("rr_clk") || col("search_result_clk")),
  castAndSum(col("search_initiation_event"))
  )
}
val
mruCoverage:
Metric = {
    new Metric(
```

```
    "MRU_IR_Coverage",
    Seq("LEX", "ES"),
    castAndSum(when(col("mru_imp") > 0, 1).otherwise(0)),
    castAndSum(col("search_initiation_event"))
    )
  }
val
querySuggestionCoverage:
Metric = {
    new Metric(
    "Query_Suggestion_IR_Coverage",
    Seq("ES"),
    castAndSum(when(col("qs_imp") > 0, 1).otherwise(0)),
    castAndSum(col("search_initiation_event"))
    )
  }
val
deflectionClickRate:
Metric = {
    new Metric(
    "Deflection_Rate",
    Seq("LEX", "ES"),
    castAndSum(col("ta_clk") || col("ta_preview_clk") || col("mru_clk") ||
        col("mru_preview_clk") || col("lv_clk") || col("lv_preview_clk")),
    castAndSum(col("search_initiation_event"))
    )
  }
```

If there are problems with the search_intiation_event (for example, because the payload_attributes_searchDialogSessionId is null), then that means there is a problem with all metrics that use this event.

In one embodiment, the search_intiation_event is a denominator in all metrics that use this event. For example, for the deflectionClickRate metric:

numerator: castAndSum(col("*ta_*clk")||col("*ta_*preview_clk")||col("*mru_*clk")||col("*mru_*preview_clk")||col("*lv_*clk")||col("*lv_*preview_clk")), denominator: castAndSum(col("search_initiation_event"))

or more simply: deflection_rate=numerator/denominator.

A 4% loss on those events means the metric computed based on those events will overestimate by 4%. If, in addition to problems with search_initiation_event, there are problems with the event mru_clk, perhaps causing a loss of 9% of those events, then the (adjusted) metric computed should be:

deflection_rate=(*ta_*clk"+"*ta_*preview_clk"+ 1.09*"*mru_*clk"+"*mru_*preview_clk"+"*lv_*clk"+ "*lv_*preview_clk")/("search_initiation_ event"*1.04)

In an embodiment, a forecasting component may provide forecast estimates, in one example, for the events: ta_clk, ta_preview_clk, mru_clk, mru_preview_clk, lv_clk, lv_preview_clk
and search_initiation_event
This would then allow a forecasted metric to be computed, as well as the expected compute metric based on sample errors: ta_clk, =30, ta_preview_clk, =4, mru_clk, =20, mru_preview_clk, =4, lv_clk, =3, lv_preview_clk=1, search_initiation_event=100.

forecast=(30+4+20+4+3+1)/100=0.62 actual=(30+4*0.91+20+4+3+1)/100*0.96=0.59

A rule for deflection_rate in one example is:
if abs(forecast-actual)>0.25 then alert
Thus, in this case, an alert would be generated.
An example illustrating a log data item error for an event called "search_results_page_click" to an example metric is shown below.
Example Metric: Search Results Page CTR
Numerator: # of search_results_page_click events
Denominator: # of search_results_page_impression events
In one example, the following selectors are used to filter an event such as "search_results_page_click" from all log data items.
"eventSource": "click"
"eventType": "user"
"locator": "searchResultPage"
"attributes.sessionId" is not null
In one example, the following selectors are used to filter an event such as "search_results_page_impression" from all log data items.
"eventSource": "refresh"
"eventType": "user"
"locator": "searchResultPage"
"attributes.sessionId" is not null
For example, assume a bug was introduced in a patch release for application 2 108. The bug may be, for example, that the logging code left out "attributes.sessionId" when logging the search_results_page_click log data item. Log data validation system 206 would report errors for "missing required field" for "attributes.sessionId" in the search_results_page_click event for PDCs 104 that have the patch release. In this example, having fewer search_results_page_click events would decrease the Search Results Page CTR metric.
In one embodiment, if metrics 122 have been produced by performance metrics generator 120 for a given time period (such as a day), metrics analytics 124 may be able to estimate a more realistic CTR. Metrics analytics 124 knows which events are affected by log data item errors from the event definitions in performance metrics generator 120. Metrics analytics 124 knows which metrics are impacted and how they are impacted by the affected events from the metrics definitions in performance metrics generator 120 (e.g., the type of event is counted in the numerator and/or the denominator of a metric). Metrics analytics 124 can estimate the number of search_results_page_click events that should be computed based on the percentage of errors being seen for that type of event from the output of log data validation system 206. Metrics analytics 124 can then estimate the actual CTR.

If metrics 122 have not been produced by performance metrics generator 120 for that time period (e.g., that day), metric analytics 124 may forecast what metrics the performance metrics generator might produce. Metrics analytics 124 can estimate the expected and actual (metric calculated without logging errors) Search Results Page CTR based on forecasts and the percentage of errors being seen for that type of event from the output of log data validation system 202. Log error and metrics quality analyzer 504 sends out alerts if the difference between an expected and actual metric is above a threshold specified in metrics analytics rules 502. In an embodiment, an alert comprises an email, a telephone call, a text, a report, a spreadsheet, a displayed image, or any other communication.

In an embodiment, an error is considered to be a valid anomaly that results in an alert being generated based at least in part on whether the error is outside of statistical confidence ranges optimized by a machine learning approach. This anomaly is called a point anomaly herein. Log error and metrics quality analyzer 504 stores point anomalies in a distributed database table (e.g., in a file in a Hadoop Distributed File System (HDFS)) without directly generating an alert for every point anomaly. Log error and metrics quality analyzer 504 analyzes point anomalies in the context of conditions called service level indicators (SLIs), and thresholding via requirements called service level objectives (SLOs) and generates collective anomalies from point anomalies. If a collective anomaly indicates a valid error, then an alert is generated and sent. In an embodiment, SLOs are organization specific requirements provided by one or more system administrators depending on their available bandwidth to handle alerts. In an embodiment, SLOs are learned by machine learning using model 612. Examples of SLIs and SLOs are shown below in Table 3.

TABLE 3

| Category | SLI | SLO |
| --- | --- | --- |
| Org-level Degradation | Number of consecutive weekday anomalies of same kind | <7 or <5% of organization history |
| Scheduled Change Anomalies | Collective anomaly rate of a subgroup | <80% |
| Catastrophic Alerts | No sudden spike/crash point anomalies on organizations within 1st percentile of traffic | <3 + standard deviations away from forecast |
| Major Trend Shifts | Trend line slope with history stability | <45 degrees of slope change |

Figure 6:
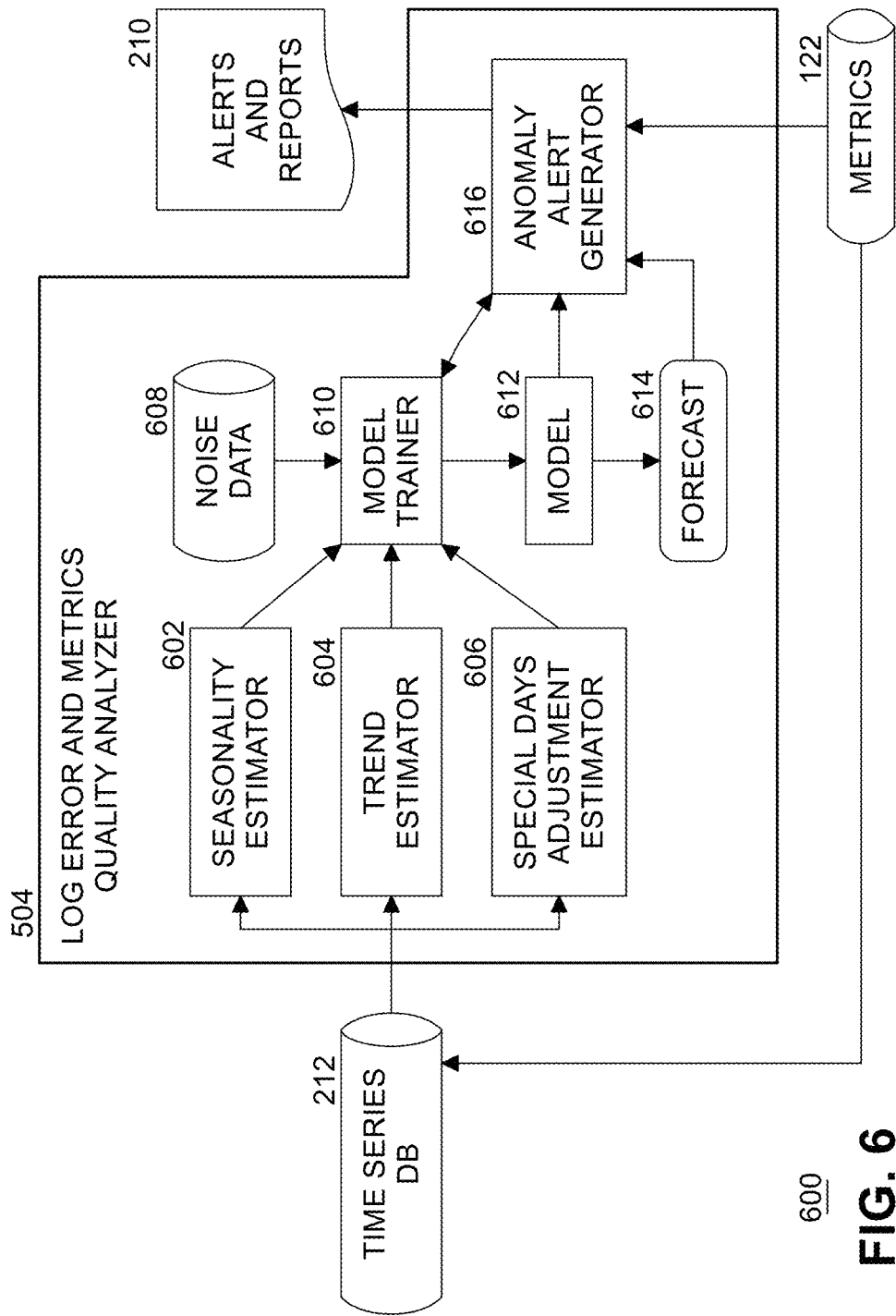
FIG. 6 is a diagram of a log error and metrics quality analyzer according to some embodiments.

FIG. 6 is a diagram 600 of log error and metrics quality analyzer 504 according to some embodiments. Log error and metrics quality analyzer 504 analyzes time series metrics data in time series DB 212 and metrics 122 using a model 612 to predict a forecast 614 of a most likely value a metric will take at a future time "t". If the metric is outside the forecast 614 by more than a predetermined threshold amount, taking into account noise data 608, then an alert 210 is generated by anomaly alert generator 616. Time series data from time series DB 212 may be selected for analysis according to various groupings, such as by organization, by a group of organizations, by geography, by client, by time zone, by type of services provided, and any other appropriate grouping.

Time series data is identical to regular data columns, with the addition of timestamps and being ordered by the time stamps. For example, if a regular data point R is (orgId, platform_description, metric_value, metric_components), then a corresponding time series dataset is an array of R_i: (timestamp_i, orgId, platform_description, metric_value, metric_components), so the time series dataset is [R_0, R_1, ..., R_n].

Log error and metrics quality analyzer 504 includes seasonality estimator 602, trend estimator 604, and special days adjustment estimator 606, each of which analyzes time series data from time series DB 212 and metrics 122 for use in training the model.

Figure 7:
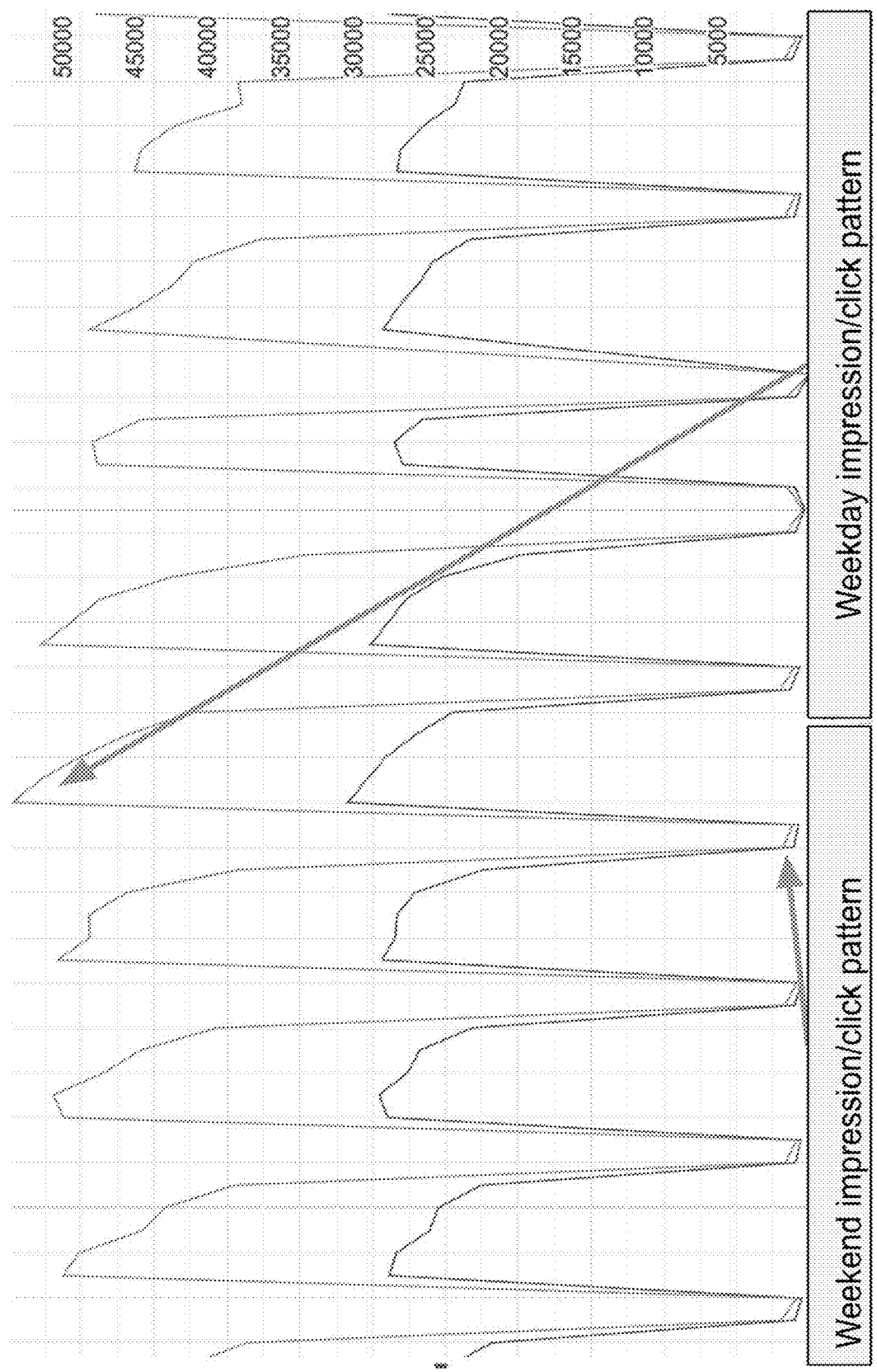
FIG. 7 is a diagram of an example seasonality chart with metric values on the vertical axis and time on the horizontal axis according to some embodiments.

Seasonality estimator 602 estimates periodic changes to metrics based on observed prior metrics. In an embodiment, the period may be any predetermined time span such a day, a week, a month, a quarter, a season (spring, summer, fall, winter), a year, and so on. For example, a selected metric may typically be lower on certain days of the week (e.g., fewer users are using the cloud computing environment on Sundays). In another example, a metric may typically be higher in a certain month (e.g., more users are shopping online in November). FIG. 7 is a diagram of an example seasonality chart with metric values on the vertical axis and time on the horizontal axis according to some embodiments.

The seasonality estimation is made by looking at historical patterns. For example, if seasonality is focusing on inter-week changes, every shift/difference between a Tuesday and Wednesday would have a representation. If there are 50 weeks of historical data, this means there are 50 data points for every Tuesday→Wednesday shift. These data points are considered as mini regression models estimating what a likely shift (ratio-wise) would be for an organization between Tuesday usage vs. Wednesday usage. This is then expanded to a larger model that analyzes the transition of each component/day-of-week of a selected season.

The seasonality estimation contributes an adjustment to the prediction of the forecast during the model training by model trainer 610, as the model 612 adjusts expected ranges from the season context. For example, if the model 612 is training for estimation of a Thursday data point and the Wednesday numbers are known, a seasonality factor for a selected client/organization can be considered, which might indicate that Tuesdays are expected to be X % higher on the selected metric with Y % lower on the traffic, thus model 612 takes these facts into account when building confidence bounds.

Figure 8:
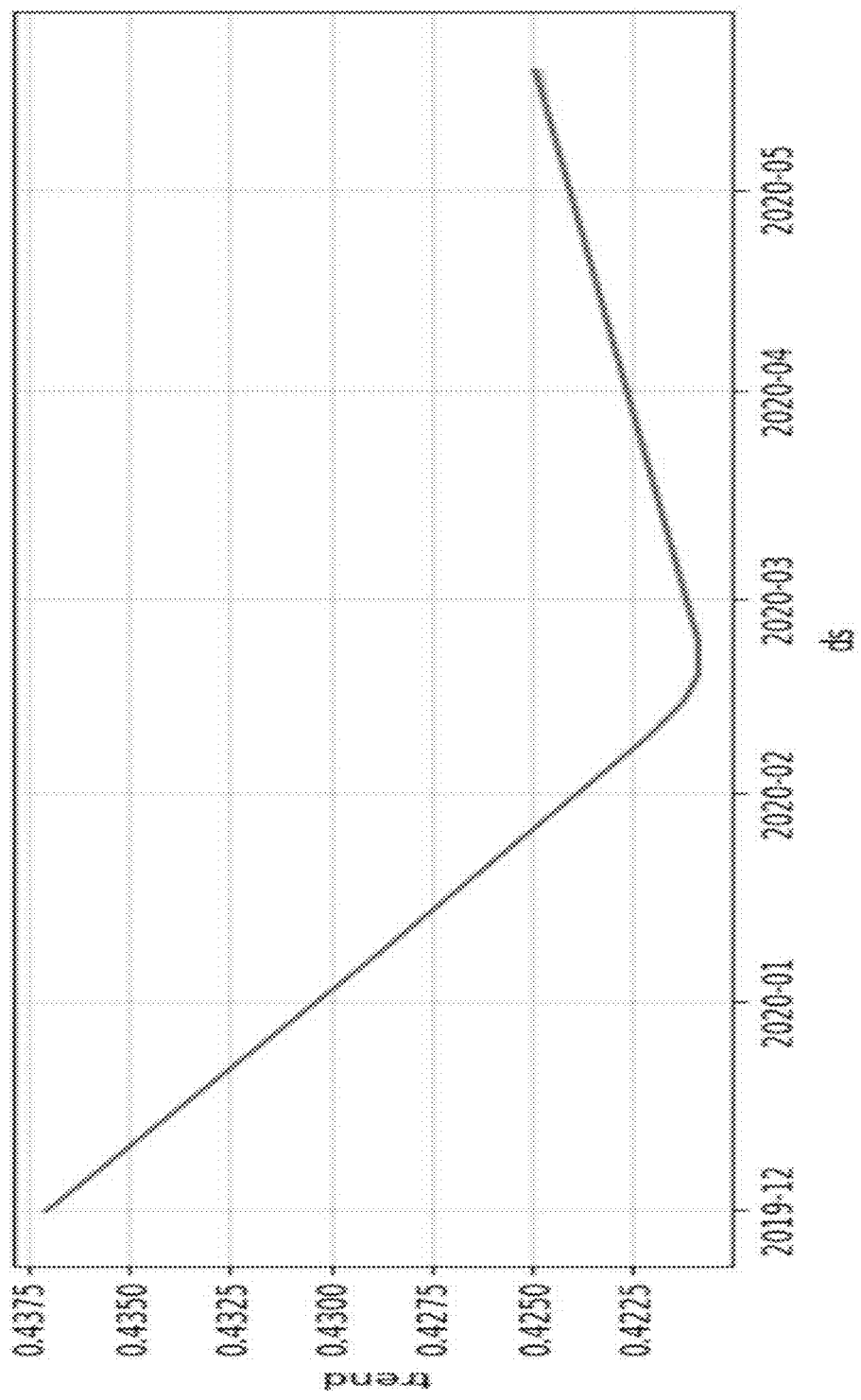
FIG. 8 is a diagram of an example trend chart with metric values on the vertical axis and time on the horizontal axis according to some embodiments.

Trend estimator 604 estimates trend changes to metrics over a time frame in a consistent manner based on observed prior metrics. In an embodiment, the period may be any predetermined time frame such a day, a week, a month, a quarter, a season (spring, summer, fall, winter), a year, and so on. For example, a metric may be increasing throughout a week, starting at a first value on a Monday and increasing to a higher value on a Friday, then restarting at approximately the first value again on the next Monday, and so on. In another example, a metric may be observed to steadily increase for a first time frame, then decrease for a second time frame. FIG. 8 is a diagram of an example trend chart with metric values on the vertical axis and time on the horizontal axis according to some embodiments.

The trend estimation is made by applying shift pointwise linear regression where the fit of the regression ($R^2$, mean-square-error, etc.) is justifiable. If the fit starts to be inapplicable, trend estimator 604 searches for a trend change point and splits/forks the regression into a new trend (as illustrated in the example of FIG. 8 where the trend is shifted). These adjustments are applied in model training when forecasting the next data point. For example, if there is a downtrend where the slope indicates the selected metric goes down 0.05% everyday, then when estimating the next day forecast this knowledge gets factored into training model 612.

Figure 9:
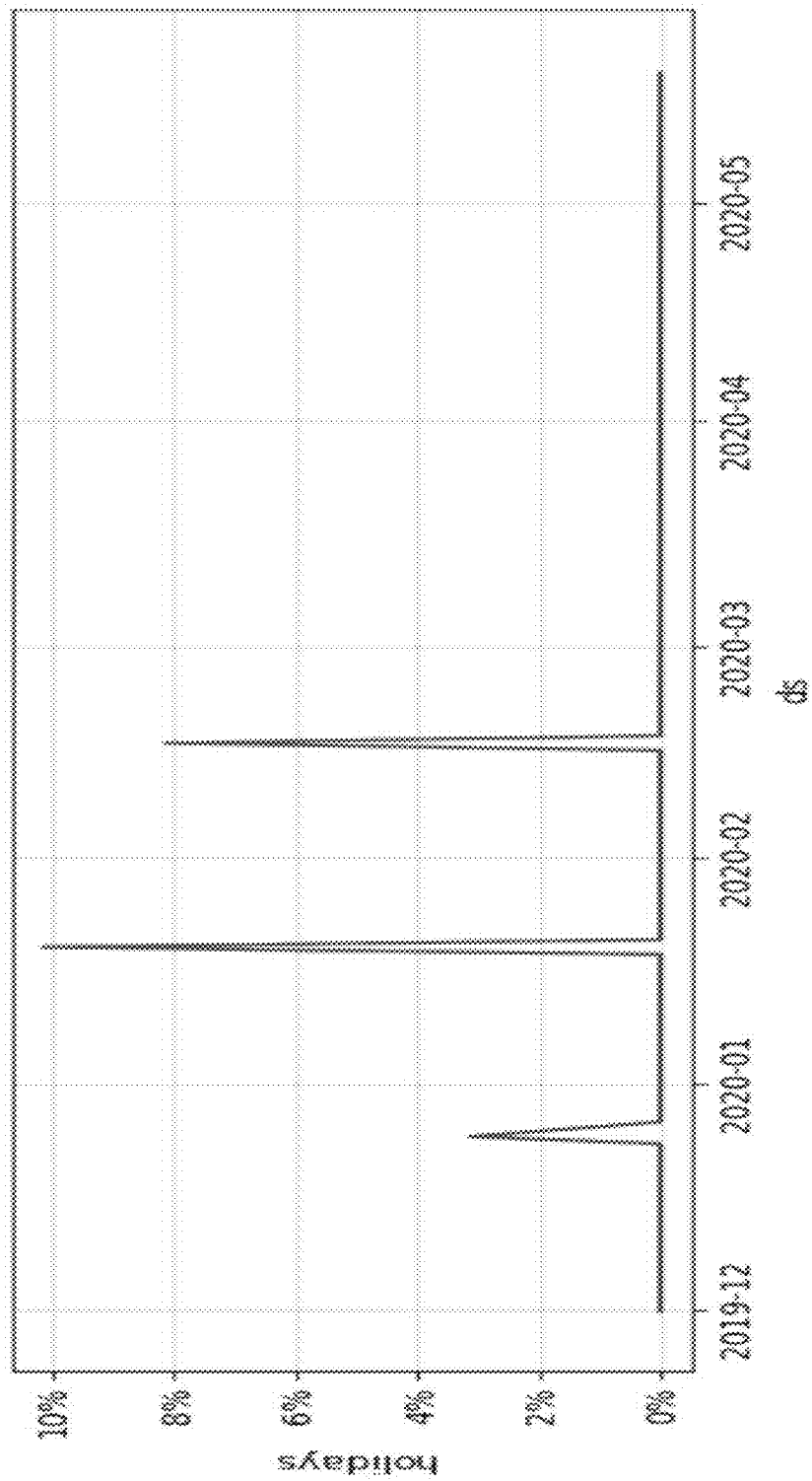
FIG. 9 is a diagram of an example special days chart with metric values on the vertical axis and time on the horizontal axis according to some embodiments.

Special days adjustment estimator 606 estimates changes to metrics on certain special days of the year. In an embodiment, special days include holidays or other days when the cloud computing environment is not used to the same extent as on other days (e.g., workdays). For example, the special days may include United States holidays (e.g., New Year's Day, Presidents Day, etc.). For example, an alert may be generated for an error detected on a workday, but not on a special day. FIG. 9 is a diagram of an example special days chart with metric values on the vertical axis and time on the horizontal axis according to some embodiments.

In an embodiment, special days estimation per client is done over a locale and recognized holidays/special days of the locale (e.g., US holidays would include Dr. Martin Luther King, Jr. (MLK) day, 4th of July, Labor Day, etc.), and specific shifts from global norms are analyzed for the client/organization on these dates in history. Special days adjustment estimator 606 then estimates a "relaxation factor" of Z % on that specific holiday. For example, huge traffic on July 4 for an organization that is a sales organization, while near zero traffic for a software organization whose users are on vacation, etc. This relaxation factor (e.g., an adjustment) is then be applied when forecasting selected metric values for the next holiday so the resulting holiday metrics do not result in triggering unnecessary alerts.

Noise data 608 includes random or pseudorandom values arbitrarily generated in advance to represent metrics. Noise data 608 is used by model trainer 610 to improve model 612 during training. The noise data is arbitrary and artificial data injected into time series data sets to confuse the model. This is done to avoid "overfitting", where the model improperly detects real patterns from the client data when they do not actually exist and fits the pattern to the existing data so perfectly that anything slightly different is considered anomalous. One reason overfitting is suboptimal is that no training data is fully representative, thus a model prone to overfitting would be vulnerable to any variance in the time series data set.

Estimates from seasonality estimator 602, trend estimator 604, and special days adjustment estimator 606 are combined with noise data 608 by model trainer 610. Each estimation is normalized and then weighed as an additive factor on what the forecasted value for the future timestamp should be. For example, if tomorrow is a Wednesday and Wednesday's metric value is expected to trend higher, these factors are added to the model forecast value, thereby increasing the expected forecast value and thus the confidence bounds.

Model trainer 610 uses the estimates to train model 612. Model 612 trained by applying various scenarios with historical training data and optimizing the outcome for a portion of this data (e.g., test data) in a repeated fashion (e.g., optimization steps), where each repeated operation of the model learns from previous findings and adjusts model parameters.

Model 612 generates forecast 614 based at least in part on the estimates and time series data from time series DB 212. In an embodiment, a forecast is a tuple of the following simplified forms: (organizationId, timestamp, other_metadata, forecast exact value, upper confidence bound, lower confidence bound). Here organanizationId and other_metadata are representative data, timestamp is the forecast date, the forecast exact value is what the model 612 predicts the metric value should be, the upper confidence bound would be what variance is acceptable for the current organization so the forecast value is within the norms for a 95% confidence range, and the lower confidence bound is similar to the upper confidence bound but for downward fluctuations.

In an embodiment, a forecast is represented as follows:

$$y(t)=g(t)+s(t)+h(t)+\varepsilon_t$$

where y(t) is the forecast of a selected metric at time t, g(t) is the trend estimate at time t, s(t) is the seasonality estimate at time t, h(t) is the special days adjustment estimate at time t, $\varepsilon_t$ and is the noise at time t.

Figure 10:
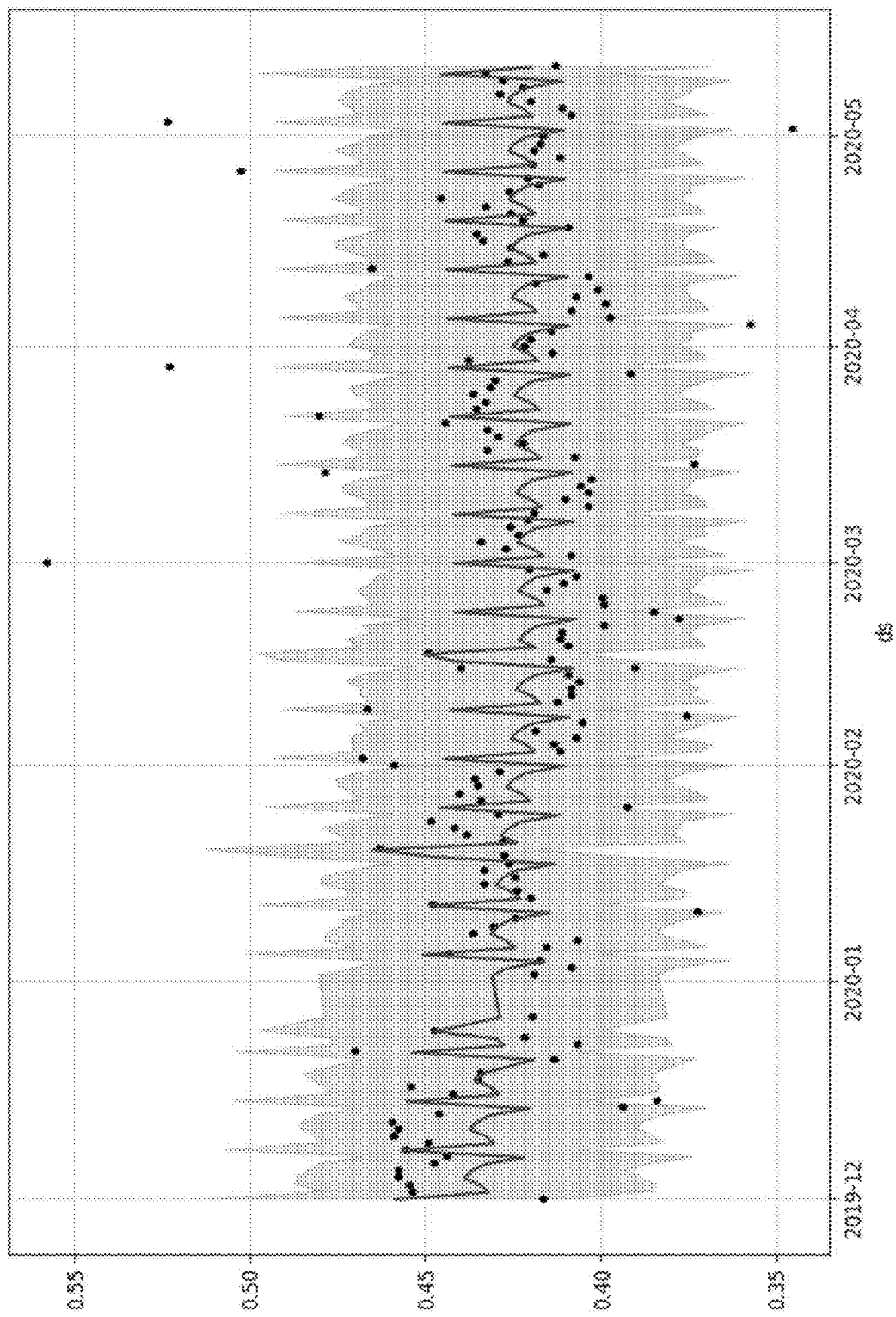
FIG. 10 is a diagram of a confidence chart with metric values on the vertical axis and time on the horizontal axis according to some embodiments.

FIG. 10 is a diagram of a confidence chart with metric values on the vertical axis and time on the horizontal axis according to some embodiments. In FIG. 10 the y axis represents a metric value that model 612 is training/estimating for and the x axis represents time (e.g., a date stamp). The black dots represent the actual observed time series data for the current organization for which model 612 is trained, the dark line represents the time series continuous line of the forecasted exact metric value described above. Model 612 estimated what the next data point should be more likely to be closer to the line then further away from the line. The upper and lower light lines and the areas in between the light lines represent the confidence range estimated for the new data points to be remain within to be considered within an acceptable variance. If the data point is outside of these bounds, the data point is considered to be a point anomaly.

As used herein, a confidence range is the value within upper and lower thresholds, where if the next data point resides, by history and recency can be considered as an acceptable fluctuation of the metric value. For example, assume an organization that has a 1,000 day history where for every single day the metric value was 0.75. Model 612 would then be confident that the next day would also be within a [0.74, 0.76] range, and outside of the anticipated range would generate an alert. On the other hand, for a different organization where every day's data point is varying between a [0.3, 0.8] range, then it would not be unexpected to get a 0.79 metric value, for example, even if tomorrow's metric value estimation is 0.64. Confidence ranges are the representation of this range of acceptable metric values.

Model 612 generates forecast 614 for time t. In an embodiment, model 612 is a regression model.

Figure 11A:
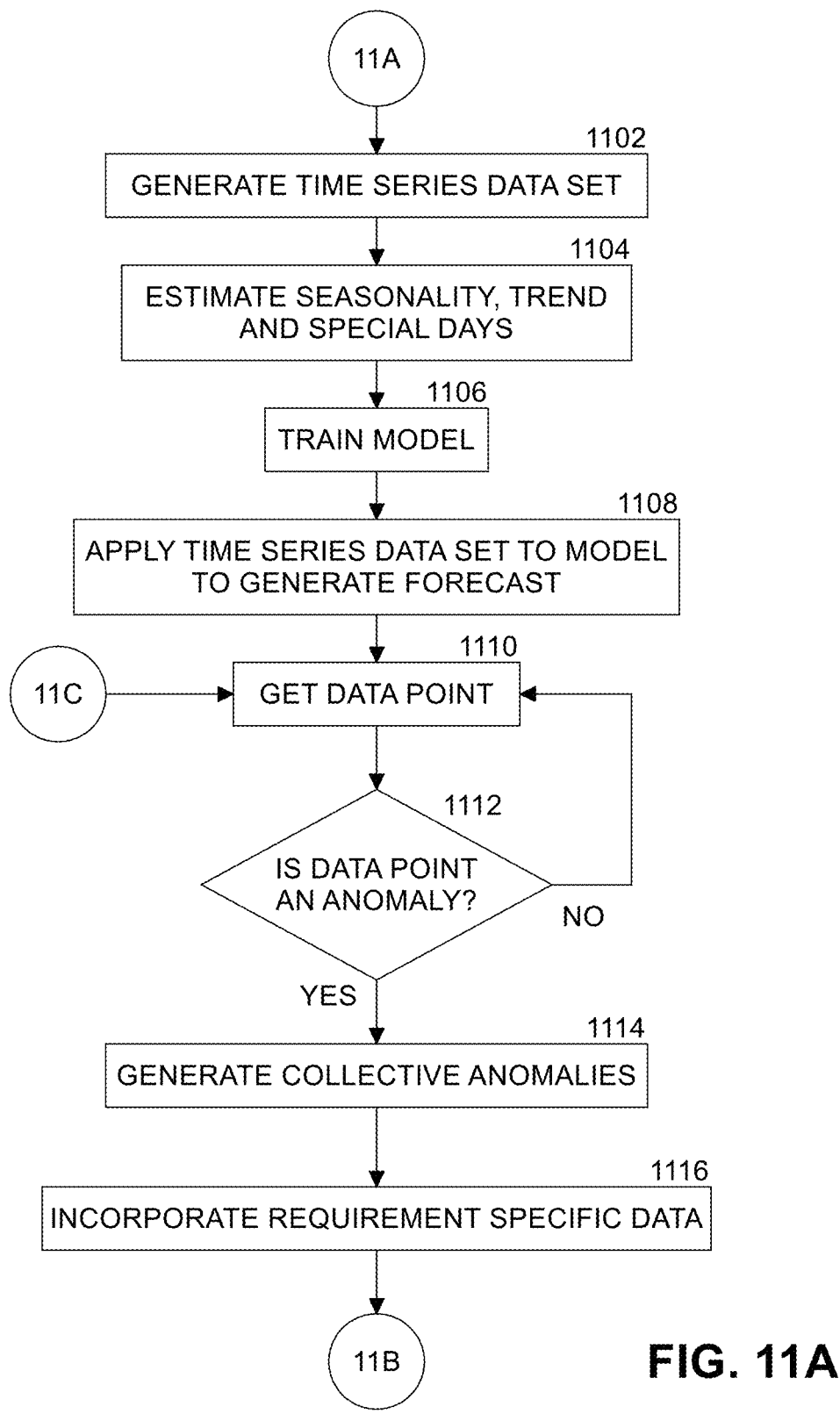
FIGS. 11A and 11B are flow diagrams of log error and metrics quality analyzer processing according to some embodiments.
Figure 11B:
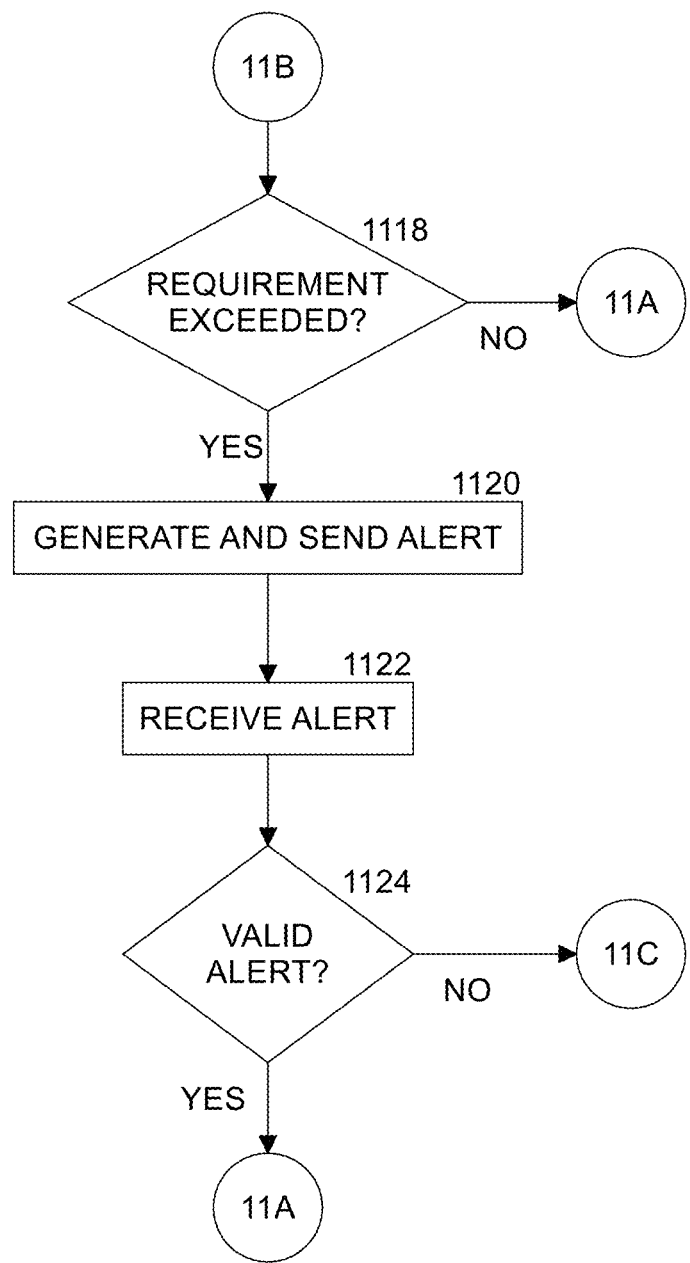

FIG. 11 is a flow diagram of log error and metrics quality analyzer processing according to some embodiments. In an embodiment, anomaly alert processing of log error and metrics quality analyzer 504 processes time series data in a loop structure where each iteration of data processing feeds the next iteration. In some deployments anomaly alert processing runs in parallel on thousands or even millions of models 612 at every iteration. For a given configuration including identifying information such as a selected metric (e.g., click through rate (CTR)), metric frequency (e.g., daily), metric granularity (e.g., organization/user experience computing platform), etc., metrics analytics 124 of performance metrics system 200 generates at least one time series data set in time series DB 212 from metrics 122 and log data validation DB 208 at block 1102. Metrics analytics 124 checks the validity of the time series data set according to statistics that might disqualify the time series dataset from being used in anomaly alerting according to minimum SLO data requirements outlined for a current use case.

In an embodiment, the statistics are estimated (by global exploration) or provided (by a system administrator) for what preliminary filters should be. For example, research suggests that any history less than eight weeks for a daily pattern is much less reliable to build a model on, so the default configuration may be set to a lower bound of a 56-day history for the current organization to be considered for a candidate for training. The system administrator can also specify what level of traffic on a daily basis is significant enough (e.g., at least 1,000 searches per day). Other statistics may also be used.

If the time series data set does not meet the minimum requirements of the SLOs (e.g., the time frame is too short for consecutive anomalies, the number of events being processed is too low for statistical significance, etc.), log error and metrics quality analyzer 504 does not train new model(s) 612 and reverts to last known model(s) 612. If no training is needed, then this iteration ends and the next iteration begins again at block 1102. If the time series data set meets the minimum SLO data requirements, then at block 1104 seasonality estimator 602, trend estimator 604, and special days adjustment estimator 606 estimate changes to metrics 122 that are used by model trainer 610 to train model 612 at block 1106.

In an embodiment, model 612 optimizes for identification of the best predictor data points. Model 612 optimizes the predictor to identify a most likely next metric value and confidence ranges. The output of the model should be sufficient to declare if the next data point is a point anomaly or not. Model 612 introduces noise data 608 consistently to avoid overfitting to the time series data set while ensuring a highest quality of confidence is achieved. Once the model training is done at block 1106, the time series data set is applied to model 612 to generate at least one forecast of metric values for future data points as well as their confidence ranges. At this point, log error and metrics quality analyzer 504 goes into a sleep mode until log error and metrics quality analyzer 504 receives a data point (e.g., a potential anomaly) at block 1110.

The data point is sent from the performance metrics generator system 200. The timing of the data point arrival is tied to this system and log error and metrics quality analyzer 504 waits for metrics value generation to be complete (e.g., in metrics 122). Log error and metrics quality analyzer 504 takes the raw metrics data 122 then converts this data into the time series data 212 for the currently selected organization.

Once a new data point is obtained, anomaly alert generator 616 determines if the data point is an anomaly. That is, anomaly alert generator 616 identifies a data point that is anomalous according to model 612, without any other context or dependency. In an embodiment, data point anomalies are not used directly to generate an alert due to the typically large number of models being trained. This means that even if false positives occur, due to the large number of models being trained it is probabilistically expected to receive many data point anomalies during every iteration. If the data point is not an anomaly according to model 612, processing continues with the next data point at block 1110.

If the data point is an anomaly according to model 612, then processing continues at block 1114 where one or more collective anomalies are generated by anomaly alert generator 616 from the data point anomalies. A collective anomaly as used herein is what the SLO threshold is being limited to (as shown above in Table 3). One simple example is three consecutive point anomalies. Another example of a collective anomaly is the aggregation of data point anomalies observed in a selected time window (e.g., at least five data point anomalies in the last seven data points, or three consecutive data point anomalies in the last three data points). In an embodiment, collective anomalies are defined in the SLOs, and are fine-tuned/optimized by characteristics of the data points as well as by system administrator requirements. Note that for time series data sets and/or metrics where data point anomalies occur too frequently, an initial global model would have higher thresholds for default SLO values. Setting the thresholds may be done outside of the iterations described here, on a higher level of model exploration by a system administrator. In an embodiment, a user can (with the guidance of a system administrator) establish SLOs (if the user knows daily patterns of a metric).

At block 1116, SLO requirement specific data is incorporated into selected types of SLOs. This is a codification of the sample requirements shown in Table 3. For example, if the requirement is a trend shift, SLO may be a simple "if statement" looking at whether a trend breakpoint occurred recently. If the requirement were to be over 3% of the history, then the function would look at the length of the training data, etc. In another example, if an organization has an AB test underway and is expected to be more sensitive to variance of a metric value, the SLO requirement specific data is embedded into the decision-making criteria of anomaly alert generator 616. Processing then continues with block 1118 on FIG. 11B via connector 11B. With all the necessary information computed in blocks 1112-1116, anomaly alert generator 616 now has all the information the anomaly alert generator needs to make a decision on whether this iteration needs escalation (e.g., according to the SLOs, the collective anomalies exceed requirements and an alert should be generated). Thus, at block 1118 if no escalation is needed processing continues with the next time series data set at block 1102 of FIG. 11A via connector 11A. If escalation is deemed necessary, then processing continues with block 1120. At block 1120, anomaly alert generator 616 summarizes one or more of the time series data, one or more anomalies, the alert cause, a visual representation of the time series data set, as well as additional statistical information that can help the system administrator who receives the alert 210 analyze the anomaly. In an embodiment, all this information is bundled into a single message and is delivered to the system administrator (e.g., if an email method is chosen for alert delivery, then the email will be sent in multipurpose Internet mail extensions (MIME) format).

In one embodiment, the process of FIG. 11 currently has an "expert in the loop", where a human system administrator makes a binary decision as to whether this anomaly escalation (in the form of an alert) was legitimate/valid or was a false alarm. In another embodiment, this decision-making process can be automated (e.g., by programmatically analyzing tickets created by the escalation process and resulting resolution of the tickets). At block 1122, the system administrator receives the alert. If the system administrator at block 1124 decides that this alert was not legitimate/valid (e.g., the alert is a false alarm) this means the model 612 was not trained on the best possible scenario, and the machine learning system of log error and metrics quality analyzer 504 needs to receive this information to retrain the model in order to make better decisions in the future. At this point, model 612 ignores the cause of the failure (e.g., bad data points that resulted in this decision), retrains confidence ranges for discovered point anomalies (e.g., for the current organization) by continuing processing with the next data point at block 1110 via connector 11C. If the system administrator decides this alert is legitimate/valid, model 612 rewards itself for making the correct decision, but also ensures that this finding is reflected in the time series data set by correcting the anomalous time series data history for subsequent iterations.

For example, if there was an anomaly, then the data points leading to the decision are not normal for the current organization so the data points should not be included in future forecasting models (which would be misleading). For example, if there were five days of bad data that resulted in model 612 determining that there was a problem with data collection, those five days of time series data should not be included in the training data.

Processing continues with the next time series data set at block 1102 via connector 11A.

Example Electronic Devices and Environments. One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all the instructions in that program.

An electronic device (also referred to as a device, computing device, computer, computer server, cloud computing server, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users.

Users can have one or more roles, such as administrator, programmer/developer, and end user roles. As an administrator, a user typically uses electronic devices to administer them for other users, and thus an administrator often works directly and/or indirectly with server devices and client devices.

Figure 12A:
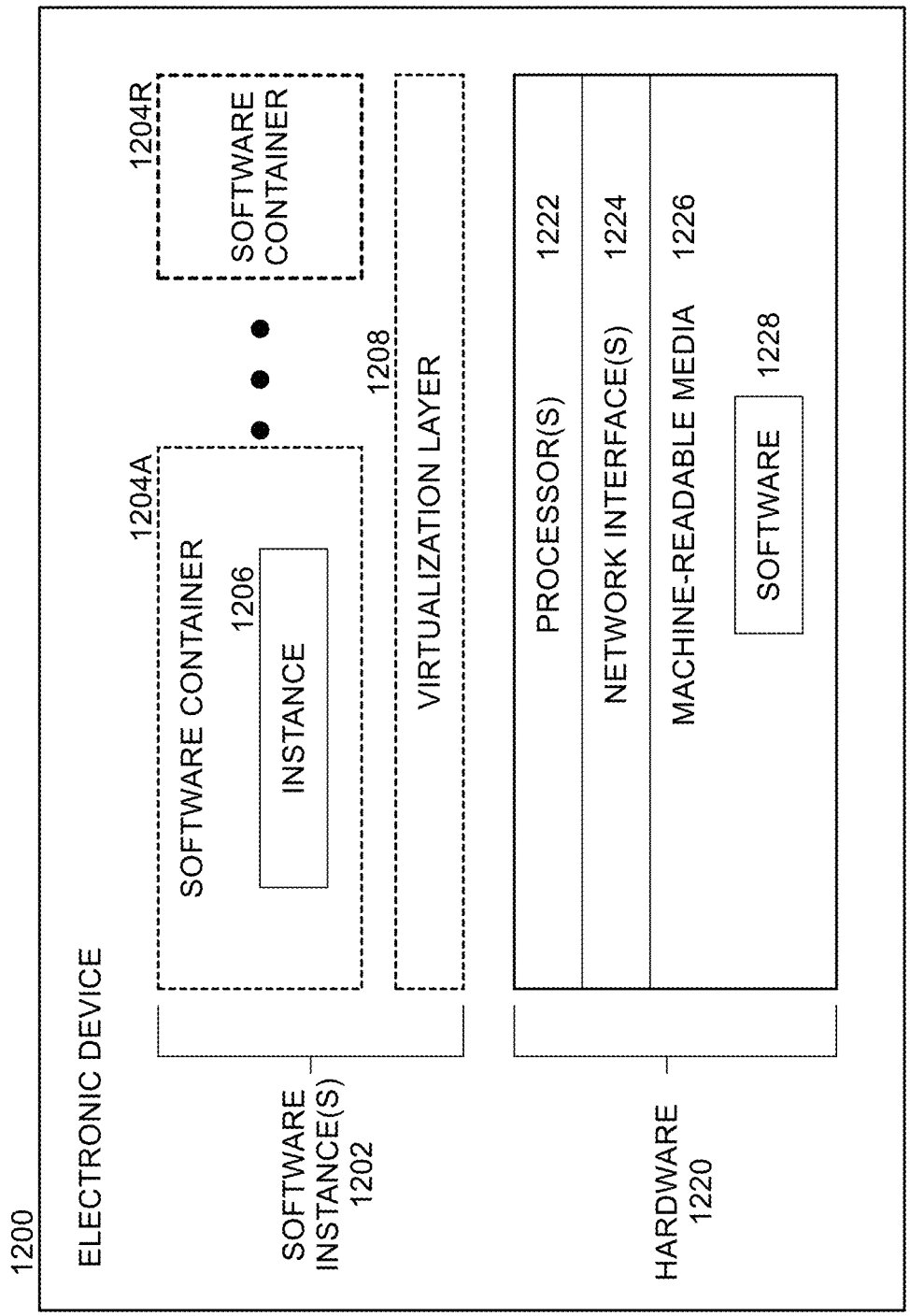
FIG. 12A is a block diagram illustrating an electronic device according to some example implementations.

FIG. 12A is a block diagram illustrating an electronic device 1200 according to some example implementations. FIG. 12A includes hardware 1220 comprising a set of one or more processor(s) 1222, a set of one or more network interfaces 1224 (wireless and/or wired), and machine-readable media 1226 having stored therein software 1228 (which includes instructions executable by the set of one or more processor(s) 1222). The machine-readable media 1226 may include non-transitory and/or transitory machine-readable media. Each of the previously described clients and schema inference and log data validation system 200 may be implemented in one or more electronic devices 1200. In one implementation: 1) each of the clients is implemented in a separate one of the electronic devices 1200 (e.g., in end user devices where the software 1228 represents the software to implement clients to interface directly and/or indirectly with the schema inference and log data validation system 200 (e.g., software 1228 represents a web browser, a native client, a portal, a command-line interface, and/or an application programming interface (API) based upon protocols such as Simple Object Access Protocol (SOAP), Representational State Transfer (REST), etc.)); 2) the schema inference and log data validation system 200 is implemented in a separate set of one or more of the electronic devices 1200 (e.g., a set of one or more server devices where the software 1228 represents the software to implement the schema inference and log data validation system 200); and 3) in operation, the electronic devices implementing the clients and the schema inference and log data validation system 200 would be communicatively coupled (e.g., by a network) and would establish between them (or through one or more other layers and/or or other services) connections for submitting UI interactions log data to the schema inference and log data validation system 200 and returning alerts and reports 122, and time series DB 124 to the clients. Other configurations of electronic devices may be used in other implementations (e.g., an implementation in which the client and the schema inference and log data validation system 200 are implemented on a single one of electronic device 1200).

During operation, an instance of the software 1228 (illustrated as instance 1206 and referred to as a software instance; and in the more specific case of an application, as an application instance) is executed. In electronic devices that use compute virtualization, the set of one or more processor(s) 1222 typically execute software to instantiate a virtualization layer 1208 and one or more software container(s) 1204A-1204R (e.g., with operating system-level virtualization, the virtualization layer 1208 may represent a container engine (such as Docker Engine by Docker, Inc. or rkt in Container Linux by Red Hat, Inc.) running on top of (or integrated into) an operating system, and it allows for the creation of multiple software containers 1204A-1204R (representing separate user space instances and also called virtualization engines, virtual private servers, or jails) that may each be used to execute a set of one or more applications; with full virtualization, the virtualization layer 1208 represents a hypervisor (sometimes referred to as a virtual machine monitor (VMM)) or a hypervisor executing on top of a host operating system, and the software containers 1204A-1204R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 1228 is executed within the software container 1204A on the virtualization layer 1208. In electronic devices where compute virtualization is not used, the instance 1206 on top of a host operating system is executed on the "bare metal" electronic device 1200. The instantiation of the instance 1206, as well as the virtualization layer 1208 and software containers 1204A-1204R if implemented, are collectively referred to as software instance(s) 1202.

Alternative implementations of an electronic device may have numerous variations from that described above. For example, customized hardware and/or accelerators might also be used in an electronic device.

Example Environment. FIG. 12B is a block diagram of a deployment environment according to some example implementations. A system 1240 includes hardware (e.g., a set of one or more server devices) and software to provide service(s) 1242, including the schema inference and log data validation system 200. In some implementations, the system 1240 is in one or more datacenter(s). These datacenter(s) may be: 1) first party datacenter(s), which are datacenter(s) owned and/or operated by the same entity that provides and/or operates some or all of the software that provides the service(s) 1242; and/or 2) third-party datacenter(s), which are datacenter(s) owned and/or operated by one or more different entities than the entity that provides the service(s) 1242 (e.g., the different entities may host some or all of the software provided and/or operated by the entity that provides the service(s) 1242). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 1240 is coupled to user devices 1280A-1280S over a network 1282. The service(s) 1242 may be on-demand services that are made available to one or more of the users 1284A-1284S working for one or more entities other than the entity which owns and/or operates the on-demand services (those users sometimes referred to as outside users) so that those entities need not be concerned with building and/or maintaining a system, but instead may make use of the service(s) 1242 when needed (e.g., when needed by the users 1284A-1284S). The service(s) 1242 may communicate with each other and/or with one or more of the user devices 1280A-1280S via one or more APIs (e.g., a REST API). In some implementations, the user devices 1280A-1280S are operated by users 1284A-1284S, and each may be operated as a client device and/or a server device. In some implementations, one or more of the user devices 1280A-1280S are separate ones of the electronic device 1200 or include one or more features of the electronic device 1200. In some embodiments, service(s) 1242 includes schema inference and log data validation system 200.

In some implementations, the system 1240 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 1240 is a multi-tenant cloud computing architecture supporting multiple services, such as one or more of the following types of services: schema inference and event validation processing, Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 1240 may include an application platform 1244 that enables PAAS for creating, managing, and executing one or more applications developed by the provider of the application platform 1244, users accessing the system 1240 via one or more of user devices 1280A-1280S, or third-party application developers accessing the system 1240 via one or more of user devices 1280A-1280S.

In some implementations, one or more of the service(s) 1242 may use one or more multi-tenant databases 1246, as well as system data storage 1250 for system data 1252 accessible to system 1240. In certain implementations, the system 1240 includes a set of one or more servers that are running on server electronic devices and that are configured to handle requests for any authorized user associated with any tenant (there is no server affinity for a user and/or tenant to a specific server). The user devices 1280A-1280S communicate with the server(s) of system 1240 to request and update tenant-level data and system-level data hosted by system 1240, and in response the system 1240 (e.g., one or more servers in system 1240) automatically may generate one or more Structured Query Language (SQL) statements (e.g., one or more SQL queries) that are designed to access the desired information from the multi-tenant database(s) 1246 and/or system data storage 1250.

In some implementations, the service(s) 1242 are implemented using virtual applications dynamically created at run time responsive to queries from the user devices 1280A-1280S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1260 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1244 includes an application setup mechanism that supports application developers' creation and management of applications, which may be saved as metadata by save routines. Invocations to such applications, including the schema inference and log data validation system 200, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 1282 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols and may include one or more intermediary devices for routing data between the system 1240 and the user devices 1280A-1280S.

Each user device 1280A-1280S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 1240. For example, the user interface device can be used to access data and applications hosted by system 1240, and to perform searches on stored data, and otherwise allow one or more of users 1284A-1284S to interact with various GUI pages that may be presented to the one or more of users 1284A-1284S. User devices 1280A-1280S might communicate with system 1240 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 1280A-1280S might include an HTTP client, commonly referred to as a "browser," for sending and receiving HTTP messages to and from server(s) of system 1240, thus allowing users 1284A-1284S of the user devices 1280A-1280S to access, process and view information, pages and applications available to it from system 1240 over network 1282.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

In the detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

In addition, the articles "a" and "an" as used herein and in the appended claims should generally be construed to mean "one or more" unless specified otherwise or clear from context to be directed to a singular form. Reference throughout this specification to "an implementation," "one implementation," "some implementations," or "certain implementations" indicates that a particular feature, structure, or characteristic described in connection with the implementation is included in at least one implementation. Thus, the appearances of the phrase "an implementation," "one implementation," "some implementations," or "certain implementations" in various locations throughout this specification are not necessarily all referring to the same implementation.

Some portions of the detailed description may be presented in terms of algorithms and symbolic representations of operations on data bits within a computer memory. These algorithmic descriptions and representations are the manner used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "retrieving," "transmitting," "computing," "generating," "adding," "subtracting," "multiplying," "dividing," "optimizing," "calibrating," "detecting," "performing," "analyzing," "determining," "enabling," "identifying," "modifying," "transforming," "applying," "aggregating," "extracting," "registering," "querying," "populating," "hydrating," "updating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Any of the software components or functions described in this application can be implemented as software code to be executed by one or more processors using any suitable computer language such as, for example, C, C++, Java™, or Python using, for example, existing or object-oriented techniques. The software code can be stored as non-transitory instructions on any type of tangible computer-readable storage medium (referred to herein as a "non-transitory computer-readable storage medium"). Examples of suitable media include random access memory (RAM), read-only memory (ROM), magnetic media such as a hard-drive or a floppy disk, or an optical medium such as a compact disc (CD) or digital versatile disc (DVD), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system and may be among other computer-readable media within a system or network. A computer system, or other computing device, may include a monitor, printer, or other suitable display for providing any of the results mentioned herein to a user.

In the foregoing description, numerous details are set forth. It will be apparent, however, to one of ordinary skill in the art having the benefit of this disclosure, that the present disclosure may be practiced without these specific details. While specific implementations have been described herein, it should be understood that they have been presented by way of example only, and not limitation. The breadth and scope of the present application should not be limited by any of the implementations described herein but should be defined only in accordance with the following and later-submitted claims and their equivalents. Indeed, other various implementations of and modifications to the present disclosure, in addition to those described herein, will be apparent to those of ordinary skill in the art from the foregoing description and accompanying drawings. Thus, such other implementations and modifications are intended to fall within the scope of the present disclosure.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A computer-implemented method comprising:
    applying a machine learning model to a plurality of data points of a time series data set representing performance of a cloud computing service such that one or more predicted metric values are generated;
    determining whether the plurality of data points of the time series data set are anomalies based on the predicted metric values generated using the machine learning model, wherein determining whether the plurality of data points of the time series data set are anomalies includes identifying and storing point anomalies in a distributed database table without directly generating an alert for each point anomaly, wherein a point anomaly comprises a data point outside of statistical confidence ranges;
    analyzing point anomalies in the context of service level indicator (SLI) conditions and service level object (SLO) threshold requirements;
    generating a collective anomaly from the point anomalies; and
    sending an alert responsive to determining that the collective anomaly is a valid error.

2. The computer-implemented method of claim 1, the collective anomaly being an aggregation of anomalous data points observed in a selected time window.

3. The computer-implemented method of claim 1, further comprising:
    determining, using the plurality of data points, one or more historical patterns of metric values;
    estimating, using the historical patterns, a seasonality adjustment; and
    training the machine learning model based at least in part on the estimated seasonal adjustment.

4. The computer-implemented method of claim 1, further comprising:
    estimating a trend adjustment based at least in part on changes in metric values over a predetermined time frame; and
    training the machine learning model based, at least in part, on the trend adjustment.

5. The computer-implemented method of claim 1, further comprising:
    estimating a special days adjustment based at least in part on changes in metric values on selected days in the plurality of data points; and
    training the machine learning model based, at least in part, on the special days adjustment.

6. The computer-implemented method of claim 1, comprising:
if an alert is determined not to be valid, providing an indication that the alert is not valid to the machine learning algorithm.

7. The computer-implemented method of claim 1, the predicted metric values including a predicted metric at a particular future time.

8. The computer-implemented method of claim 1, further comprising:
determining the plurality of data points of the time series data set are anomalies if the plurality of data points are outside a confidence range defined by a lower threshold and an upper threshold.

9. The computer-implemented method of claim 1, comprising generating the time series data set from metric values measuring interactions of users with user interfaces of applications running in a cloud computing environment.

10. An apparatus comprising:
one or more servers, the servers including a computer processor configurable to cause:
applying a machine learning model to a plurality of data points of a time series data set representing performance of a cloud computing service such that one or more predicted metric values are generated;
determining whether the plurality of data points of the time series data set are anomalies based on the predicted metric values generated using the machine learning model, wherein determining whether the plurality of data points of the time series data set are anomalies includes identifying and storing point anomalies in a distributed database table without directly generating an alert for each point anomaly, wherein a point anomaly comprises a data point outside of statistical confidence ranges;
analyzing point anomalies in the context of service level indicator (SLI) conditions and service level object (SLO) threshold requirements;
generating a collective anomaly from the point anomalies; and
sending an alert responsive to determining that the collective anomaly is a valid error.

11. The apparatus of claim 10, the servers further configurable to cause:
determining, using the plurality of data points, one or more historical patterns of metric values indicating a seasonality adjustment; and
training the machine learning model based at least in part on the one or more historical patterns of metric values.

12. The apparatus of claim 10, the servers further configurable to cause:
estimating a trend adjustment based at least in part on changes in metric values over a predetermined time frame; and
training the machine learning model based, at least in part, on the trend adjustment.

13. The apparatus of claim 10, the servers further configurable to cause:
ascertaining changes in metric values on a set of days;
training the machine learning model based at least in part on the changes in metric values on the set of days.

14. The apparatus of claim 10, the predicted metric values including
a predicted metric at a particular future time.

15. The apparatus of claim 10, the servers further configurable to cause:
the machine learning model determining the plurality of data points of the time series data set are anomalies if the plurality of data points is are outside a confidence range defined by a lower threshold and an upper threshold.

16. A non-transitory machine-readable storage medium that provides instructions that, when executed by one or more processors, are configurable to cause the one or more processors to perform operations comprising:
applying a machine learning model to a plurality of data points of a time series data set representing performance of a cloud computing service such that one or more predicted metric values are generated;
determining whether the plurality of data points of the time series data set are anomalies based on the predicted metric values generated using the machine learning model, wherein determining whether the plurality of data points of the time series data set are anomalies includes identifying and storing point anomalies in a distributed database table without directly generating an alert for each point anomaly, wherein a point anomaly comprises a data point outside of statistical confidence ranges;
analyzing point anomalies in the context of service level indicator (SLI) conditions and service level object (SLO) threshold requirements;
generating a collective anomaly from the point anomalies; and
sending an alert responsive to determining that the collective anomaly is a valid error.

17. The non-transitory machine-readable storage medium of claim 16, the collective anomaly being an aggregation of anomalous data points observed in a selected time window.

18. A non-transitory machine-readable storage medium of claim 16, further providing instructions that, if executed by one or more processors, are configurable to cause the one or more processors to perform operations comprising:
determining, using the plurality of data points, one or more historical patterns of metric values;
estimating, using the historical patterns, a seasonality adjustment; and
training the machine learning model based at least in part on the estimated seasonal adjustment.

19. The non-transitory machine-readable storage medium of claim 16 that provides instructions that, if executed by one or more processors, are configurable to cause the one or more processors to perform operations comprising:
estimating a trend adjustment based at least in part on changes in metric values over a predetermined time frame; and
training the machine learning model based, at least in part, on the trend adjustment.

20. The non-transitory machine-readable storage medium of claim 16 that provides instructions that, if executed by one or more processors, are configurable to cause the one or more processors to perform operations comprising:
estimating a special days adjustment based at least in part on changes in metric values on selected days in the plurality of data points; and
training the machine learning model based, at least in part, on the special days adjustment.

21. The non-transitory machine-readable storage medium of claim 16 that provides instructions that, if executed by one or more processors, are configurable to cause the one or more processors to perform operations comprising if an alert is determined not to be valid, providing an indication that the alert is not valid to the machine learning algorithm.

22. The non-transitory machine-readable storage medium of claim 16, wherein the forecast comprises the most likely value of the metric at the selected future time based on one or more of a seasonality adjustment based at least in part on one or more historical patterns of metric values, a trend adjustment based at least in part on changes in metric values over a predetermined time frame, a special days adjustment based at least in part on changes in metric values on selected days, and noise data in the time series data set.

* * * * *